(12) United States Patent
Hu et al.

(10) Patent No.: US 12,535,989 B2
(45) Date of Patent: Jan. 27, 2026

(54) SOUND EFFECT ADJUSTMENT METHOD AND ELECTRONIC DEVICE

(71) Applicant: HUAWEI TECHNOLOGIES CO., LTD., Guangdong (CN)

(72) Inventors: Weixiang Hu, Beijing (CN); Wei Li, Beijing (CN); Chen Sun, Beijing (CN); Shuailin Lv, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 299 days.

(21) Appl. No.: 18/258,883

(22) PCT Filed: Dec. 13, 2021

(86) PCT No.: PCT/CN2021/137362
§ 371 (c)(1),
(2) Date: Jun. 22, 2023

(87) PCT Pub. No.: WO2022/135201
PCT Pub. Date: Jun. 30, 2022

(65) Prior Publication Data
US 2024/0045645 A1    Feb. 8, 2024

(30) Foreign Application Priority Data
Dec. 23, 2020    (CN) .......................... 202011542202.0

(51) Int. Cl.
*H03G 3/00*    (2006.01)
*G06F 3/16*    (2006.01)

(52) U.S. Cl.
CPC .................................. *G06F 3/165* (2013.01)

(58) Field of Classification Search
CPC ....................................................... G06F 3/165
(Continued)

(56) References Cited

U.S. PATENT DOCUMENTS

| 6,069,567 A | 5/2000 | Zawilski |
| 10,511,906 B1 * | 12/2019 | Moore ..................... H04R 3/12 |

(Continued)

FOREIGN PATENT DOCUMENTS

| CN | 101442636 A | 5/2009 |
| CN | 103888877 A | 6/2014 |

(Continued)

OTHER PUBLICATIONS

Extended European Search Report in European Appln. No. 21909198.0, mailed on Mar. 14, 2024, 8 pages.

(Continued)

*Primary Examiner* — William J Deane, Jr.
(74) *Attorney, Agent, or Firm* — Fish & Richardson P.C.

(57) ABSTRACT

This application discloses a sound effect adjustment method and an electronic device. In the method, a first electronic device that plays first audio may indicate a second electronic device to start up an audio collection apparatus, to collect an ambient sound and obtain ambient audio. The second electronic device is an electronic device with a highest possibility that a user carries the electronic device. Based on the first audio and the ambient audio, the first electronic device may determine a difference between a listening sound effect of the first audio at a location of the second electronic device and an optimal sound effect. The first electronic device may adjust an audio parameter for playing the first audio, so that the listening sound effect of the first audio at the location of the second electronic device reaches the optimal sound effect.

20 Claims, 11 Drawing Sheets

(58) Field of Classification Search
USPC .............................................. 381/61; 700/94
See application file for complete search history.

(56) References Cited

U.S. PATENT DOCUMENTS

| | | | | |
|---|---|---|---|---|
| 10,524,053 | B1* | 12/2019 | Moore | H04R 1/403 |
| 2004/0237750 | A1* | 12/2004 | Smith | G11B 27/105 |
| | | | | 84/1 |
| 2006/0088174 | A1 | 4/2006 | Deleeuw et al. | |
| 2007/0078551 | A1* | 4/2007 | Lai | G11B 20/10 |
| | | | | 381/61 |
| 2014/0348357 | A1* | 11/2014 | Liang | G10K 11/341 |
| | | | | 381/303 |
| 2017/0347218 | A1* | 11/2017 | Jeon | H04S 3/008 |
| 2019/0394567 | A1* | 12/2019 | Moore | H04R 3/04 |
| 2023/0418551 | A1* | 12/2023 | Ohkuma | G10H 1/46 |

FOREIGN PATENT DOCUMENTS

| | | | |
|---|---|---|---|
| CN | 105915826 | A | 8/2016 |
| CN | 108737896 | A | 11/2018 |
| CN | 108924725 | A | 11/2018 |

OTHER PUBLICATIONS

International Search Report and Written Opinion in International Appln. No. PCT/CN2021/137362, mailed on Jan. 29, 2022, 16 pages (with English translation).

\* cited by examiner

SOUND EFFECT ADJUSTMENT METHOD AND ELECTRONIC DEVICE

CROSS-REFERENCE TO RELATED APPLICATIONS

This application is a national stage of International Application No. PCT/CN2021/137362, filed on Dec. 13, 2021, which claims priority to Chinese Patent Application No. 202011542202.0, filed on Dec. 23, 2020. Both of the aforementioned applications are hereby incorporated by reference in their entireties.

TECHNICAL FIELD

This application relates to the field of terminal technologies, and in particular, to a sound effect adjustment method and an electronic device.

BACKGROUND

With popularization and application of various audio playback devices (for example, a television and a sound box), a user has a higher requirement on a sound effect of audio played by the audio playback device. A proper sound effect may provide a good hearing feeling for the user.

The sound effect of the audio played by the audio playback device is usually preset before the electronic device is delivered from a factory or is manually set by the user. In a process in which the audio playback device plays the audio, the sound effect does not change or needs to be manually adjusted by the user. In the audio playback process, when a distance or an angle between the user and the device changes, or noise in a surrounding environment is loud, it is difficult for the sound effect of the audio played by the audio playback device to bring the good hearing feeling to the user, and an operation in which the user manually adjusts the sound effect is cumbersome.

SUMMARY

This application provides a sound effect adjustment method and an electronic device, to collect an audio signal by using an electronic device with a highest possibility that a user carries the electronic device near an audio playback device, so as to determine a listening sound effect of the user when audio is played by the audio playback device at a location of the user. Further, the audio playback device may adjust, based on the listening sound effect of the user, an audio parameter of the audio when the audio is played, so that the listening sound effect of the user reaches an optimal sound effect. According to the foregoing method of dynamically adjusting the sound effect, the listening sound effect of the user is not affected by a factor such as a change of a distance between the user and the audio playback device, a change of an angle, or a change of ambient noise. Therefore, audio listening experience of the user is improved.

According to a first aspect, this application provides a sound effect adjustment method. The method may be applied to a sound effect adjustment system. The sound effect adjustment system may include a first electronic device and a second electronic device. A communication connection is established between the first electronic device and the second electronic device. The first electronic device may be configured to play first audio. The second electronic device may be configured to collect second audio when the first audio is played. The method includes: determining a second sound effect based on the second audio when the first audio is played at a first sound effect, where the second sound effect is a listening sound effect on the second electronic device of the first audio played at the first sound effect; and determining a playback sound effect of the first audio as a fourth sound effect when a difference between the second sound effect and a third sound effect exceeds a first difference, where a difference between the third sound effect and a listening sound effect on the second electronic device of the first audio played at the fourth sound effect is less than the first difference, and the third sound effect is an optimal sound effect of the first audio played at the first sound effect.

The first audio may be audio of music, audio of a video, audio in a voice call, audio in a video call, or the like. A source of the first audio is not specifically limited in this embodiment of this application.

Both the first sound effect and the fourth sound effect are the playback sound effects of playing the first audio by the first electronic device. The playback sound effect may be a sound effect of the audio that is output by an audio output apparatus in the first electronic device. The first electronic device may adjust the playback sound effect by changing loudness or adjusting an audio parameter such as a parameter in an equalizer of an audio signal and a parameter in a dynamic range controller.

The second sound effect is the listening sound effect. The listening sound effect may be a sound effect that is of the audio played by the first electronic device and that is heard by an ear of a user. An audio signal collected by an electronic device carried by the user may be for determining the listening sound effect of the user. The listening sound effect is mainly determined based on the playback sound effect. The listening sound effect is also affected by a factor such as a distance between the user and the electronic device, an angle, and ambient noise. The playback sound effect may be a listening sound effect heard when a distance between the user and an audio playback device approaches zero.

The third sound effect is the optimal sound effect. The optimal sound effect may be a sound effect of the audio played by the electronic device at an optimal listening location and in a quiet environment. It may be understood that the optimal sound effect may be a listening sound effect with optimal listening experience when the user listens to the audio played by the electronic device.

In a possible implementation, the first electronic device may obtain an optimal sound effect mapping table. The optimal sound effect mapping table may include a correspondence between playing different audio at different playback sound effects and a value of the audio parameter at the optimal sound effect. For example, the electronic device plays the first audio when the audio parameter is a first parameter (for example, loudness is 10 decibels, and a parameter of the EQ and a parameter of the DRC are preset parameters). The electronic device may determine, based on the optimal sound effect mapping table, that an audio parameter of the first audio at the optimal sound effect is a second parameter. The optimal sound effect mapping table may be preset in the first electronic device before the first electronic device is delivered from a factory. A value of each audio parameter in the optimal sound effect mapping table may be determined based on a professional indication for adjusting the audio parameter in a conventional technology. The optimal sound effect mapping table may alternatively be obtained by the first electronic device from a cloud server.

In another possible implementation, the first electronic device may determine a value of the audio parameter at the optimal sound effect by using an optimal sound effect calculation algorithm. The optimal sound effect calculation algorithm may indicate a correspondence between playing different audio at different sound effects and the value of the audio parameter at the optimal sound effect. The optimal sound effect calculation algorithm may be determined based on a professional indication for adjusting the audio parameter in a conventional technology. The optimal sound effect calculation algorithm may be locally stored in the first electronic device or stored in a cloud server.

With reference to the first aspect, in some embodiments, when the difference between the second sound effect and the third sound effect does not exceed the first difference, the first electronic device may continue to play the first audio at the first sound effect.

With reference to the first aspect, in some embodiments, when the first audio is played at the first sound effect, a listening sound effect on the second electronic device at a first location is different from a listening sound effect on the second electronic device at a second location. The first location and the second location are different locations.

It can be learned from the foregoing method that the first electronic device that plays the first audio may collect, by using the second electronic device carried by the user, an ambient sound at a location of the user. Based on the first audio and an evaluation result of ambient audio at the location of the user, the first electronic device may determine a listening sound effect of the first audio at the location of the user. The first electronic device may adjust the playback sound effect of the first audio, so that the listening sound effect of the first audio at the location of the user reaches the sound effect at the optimal listening location and in the quiet environment. In other words, in a process of playing audio by the first electronic device, a sound effect (namely, the listening sound effect) heard by the user may not be affected by a factor such as a change of a distance between the user and the first electronic device, a change of an angle, or a change of ambient noise. The first electronic device may dynamically adjust the playback sound effect of the first audio based on a change of a location environment of the user, to improve audio listening experience of the user.

With reference to the first aspect, in some embodiments, the first electronic device or the second electronic device may determine the second sound effect based on the second audio when the first audio is played at the first sound effect.

With reference to the first aspect, in some embodiments, the first electronic device or the second electronic device may determine the playback sound effect of the first audio as the fourth sound effect when the difference between the second sound effect and the third sound effect exceeds the first difference.

For example, the first electronic device includes a sound effect evaluation module. The sound effect evaluation module may determine the second sound effect based on the second audio when the first audio is played at the first sound effect. The sound effect evaluation module may determine the playback sound effect of the first audio as the fourth sound effect when the difference between the second sound effect and the third sound effect exceeds the first difference. The first electronic device further includes a sound effect adjustment module. The sound effect adjustment module may adjust, from the first sound effect to the fourth sound effect, the playback sound effect of playing the first audio by the first electronic device. The first electronic device may play the first audio at the fourth sound effect. Further, when the first audio is played at the fourth sound effect, the sound effect evaluation module may determine, based on audio collected by the second electronic device, whether the listening sound effect on the second electronic device reaches an optimal sound effect of the first audio played at the fourth sound effect.

After collecting the second audio, the second electronic device may send the second audio to the first electronic device.

Optionally, the second electronic device includes a sound effect evaluation module, and may determine the playback sound effect of the first audio as the fourth sound effect. The second electronic device may send the fourth sound effect to the first electronic device. The audio adjustment module of the first electronic device may adjust, from the first sound effect to the fourth sound effect, the playback sound effect of playing the first audio.

The first electronic device may send, to the second electronic device, the first audio played at the first sound effect.

With reference to the first aspect, in some embodiments, the sound effect adjustment system may further include a third electronic device. A communication connection may be established between the first electronic device and the third electronic device. The third electronic device may determine the second sound effect based on the second audio when the first audio is played at the first sound effect, and determine the playback sound effect of the first audio as the fourth sound effect when the difference between the second sound effect and the third sound effect exceeds the first difference.

For example, the third electronic device may include a sound effect evaluation module, and may determine the playback sound effect of the first audio as the fourth sound effect. The third electronic device may send the fourth sound effect to the first electronic device. The audio adjustment module of the first electronic device may adjust, from the first sound effect to the fourth sound effect, the playback sound effect of playing the first audio.

The second electronic device may send the collected second audio to the first electronic device. The first electronic device may send, to the third electronic device, the first audio played at the first sound effect and the second audio from the second electronic device. Optionally, the first electronic device may indicate the second electronic device to establish a communication connection to the third electronic device. The second electronic device may send the second audio to the third electronic device. The first electronic device may send, to the third electronic device, the first audio played at the first sound effect.

With reference to the first aspect, in some embodiments, the first electronic device may determine an electronic device that includes the foregoing sound effect evaluation module and that is in electronic devices (for example, the second electronic device and the third electronic device) that establish a communication connection to the first electronic device. The second electronic device and the third electronic device both have the sound effect evaluation module. The first electronic device may select one of the second electronic device and the third electronic device based on processing capability strength of the electronic devices or busy degrees of the electronic devices, to determine the second sound effect based on the second audio when the first audio is played at the first sound effect, or determine the playback sound effect of the first audio as the fourth sound effect when the difference between the second sound effect and the third sound effect exceeds the first difference.

According to the foregoing method, software and hardware resources of an electronic device near the first electronic device can be properly scheduled, so that sound effect evaluation efficiency is improved, and sound effect adjustment is better performed.

With reference to the first aspect, in some embodiments, after detecting a user operation of playing the first audio, the first electronic device may play the first audio at the first sound effect, and establish a communication connection (for example, a Bluetooth connection or a Wi-Fi connection) to a nearby electronic device. A user may perform a manual operation to establish a first-time communication connection between the first electronic device and the nearby electronic device. A second-time communication connection and a subsequent communication connection between the first electronic device and the nearby electronic device may be automatically completed by the first electronic device and the nearby electronic device.

With reference to the first aspect, in some embodiments, the first electronic device may provide an option for selecting an electronic device that collects the second audio, where the electronic device option includes an option corresponding to the second electronic device. The first electronic device receives a user operation of selecting the option corresponding to the second electronic device. The first electronic device may indicate the second electronic device to collect the second audio.

In other words, the user may select an electronic device carried by the user to collect the second audio, to assist the first electronic device in dynamically adjusting a sound effect.

With reference to the first aspect, in some embodiments, the first electronic device may determine, based on a first priority rule, that the second electronic device is an electronic device with a highest priority in electronic devices that each establish a communication connection to the first electronic device, and indicate the second electronic device to collect the second audio. A principle of determining a priority sequence of the electronic devices in the first priority rule is: determining, based on device types of the electronic devices, possibilities that a user carries the electronic devices, where an electronic device with a higher possibility that the user carries the electronic device has a higher priority in the first priority rule.

For example, the first priority rule may be that a priority of a wearable device is higher than a priority of a mobile phone.

The first priority rule may be preset.

With reference to the first aspect, in some embodiments, the second audio may include a first audio part and a background noise part. The second sound effect is determined based on the first audio part and the background noise part. Louder background noise indicated by the background noise part indicates that loudness in the fourth sound effect is greater than loudness in the first sound effect.

In other words, when background noise at the location of the user is louder, the first electronic device may increase loudness, to prevent the background noise from drowning a sound of the first audio played by the first electronic device.

With reference to the first aspect, in some embodiments, when the background noise part includes a human sound, loudness in the first sound effect may be the same as loudness in the first sound effect, or loudness in the fourth sound effect is smaller than loudness in the first sound effect.

In other words, when the background noise part includes the human sound, there is a high probability that the user is chatting with another person or is making a call. The first electronic device keeps the loudness of playing the first audio unchanged or decreases the loudness of playing the first audio, so that impact of playing the first audio on a user chat or a call can be reduced, to prevent the sound of the first audio from interfering with a sound of user speaking.

According to a second aspect, this application further provides a sound effect adjustment method. The method includes: A first electronic device may play first audio at a first sound effect, and establish a communication connection to a second electronic device. The first electronic device may receive second audio from the second electronic device, where the second audio is collected by the second electronic device when the first audio is played. The first electronic device may determine a second sound effect based on the second audio, where the second sound effect is a listening sound effect on the second electronic device of the first audio played at the first sound effect. The first electronic device determines a playback sound effect of the first audio as a fourth sound effect when a difference between the second sound effect and a third sound effect exceeds a first difference, where a difference between the third sound effect and a listening sound effect on the second electronic device of the first audio played at the fourth sound effect is less than the first difference, and the third sound effect is an optimal sound effect of the first audio played at the first sound effect.

It can be learned from the foregoing method that the first electronic device that plays the first audio may collect, by using the second electronic device carried by a user, an ambient sound at a location of the user. Based on the first audio and an evaluation result of ambient audio at the location of the user, the first electronic device may determine a listening sound effect of the first audio at the location of the user. The first electronic device may adjust the playback sound effect of the first audio, so that the listening sound effect of the first audio at the location of the user reaches the sound effect at the optimal listening location and in the quiet environment. In other words, in a process of playing audio by the first electronic device, a sound effect (namely, the listening sound effect) heard by the user may not be affected by a factor such as a change of a distance between the user and the first electronic device, a change of an angle, or a change of ambient noise. The first electronic device may dynamically adjust the playback sound effect of the first audio based on a change of a location environment of the user, to improve audio listening experience of the user.

With reference to the second aspect, in some embodiments, the first electronic device may provide an option for selecting an electronic device that collects the second audio, where the electronic device option includes an option corresponding to the second electronic device. The first electronic device receives a user operation of selecting the option corresponding to the second electronic device. The first electronic device may indicate the second electronic device to collect the second audio.

In other words, the user may select an electronic device carried by the user to collect the second audio, to assist the first electronic device in dynamically adjusting a sound effect.

With reference to the second aspect, in some embodiments, the first electronic device may determine, based on a first priority rule, that the second electronic device is an electronic device with a highest priority in electronic devices that each establish a communication connection to the first electronic device, and indicate the second electronic device to collect the second audio. A principle of determining a priority sequence of the electronic devices in the first priority rule is: determining, based on device types of the electronic devices, possibilities that a user carries the electronic devices, where an electronic device with a higher possibility that the user carries the electronic device has a higher priority in the first priority rule.

For example, the first priority rule may be that a priority of a wearable device is higher than a priority of a mobile phone.

With reference to the second aspect, in some embodiments, the second audio includes a first audio part and a background noise part. The second sound effect may be determined based on the first audio part and the background noise part. Louder background noise indicated by the background noise part indicates that loudness in the fourth sound effect is greater than loudness in the first sound effect.

In other words, when background noise at the location of the user is louder, the first electronic device may increase loudness, to prevent the background noise from drowning a sound of the first audio played by the first electronic device.

With reference to the second aspect, in some embodiments, when the background noise part includes a human sound, loudness in the fourth sound effect may be the same as loudness in the first sound effect, or loudness in the fourth sound effect may be smaller than loudness in the first sound effect.

In other words, when the background noise part includes the human sound, there is a high probability that the user is chatting with another person or is making a call. The first electronic device keeps the loudness of playing the first audio unchanged or decreases the loudness of playing the first audio, so that impact of playing the first audio on a user chat or a call can be reduced, to prevent the sound of the first audio from interfering with a sound of user speaking.

With reference to the second aspect, in some embodiments, by adjusting a sound effect parameter, the first audio is adjusted from being played at the first sound effect to being played at the fourth sound effect, and the audio parameter may include one or more of the following: loudness, a parameter in an equalizer, or a parameter in a dynamic range controller.

According to a third aspect, this application provides an electronic device. The electronic device is a first electronic device. The first electronic device may include an audio output apparatus, a communication apparatus, a memory, and a processor. The audio output apparatus may be configured to play first audio at a first sound effect. The communication apparatus may be configured to establish a communication connection to a second electronic device, and receive second audio from the second electronic device. The second audio may be collected by the second electronic device when the first audio is played. The memory is configured to store a computer program. The processor may be configured to invoke the computer program, to enable the first electronic device to perform any possible implementation of the second aspect.

According to a fourth aspect, this application provides a computer storage medium, including instructions. When the instructions are run on an electronic device, the electronic device is enabled to perform any possible implementation of the first aspect, or the electronic device is enabled to perform any possible implementation of the second aspect.

According to a fifth aspect, an embodiment of this application provides a chip, and the chip is applied to an electronic device. The chip includes one or more processors, and the processor is configured to invoke computer instructions, to enable the electronic device to perform any possible implementation of the first aspect, or enable the electronic device to perform any possible implementation of the second aspect.

According to a sixth aspect, an embodiment of this application provides a computer program product including instructions. When the computer program product runs on a device, the electronic device is enabled to perform any possible implementation of the first aspect, or the electronic device is enabled to perform any possible implementation of the second aspect.

It may be understood that the electronic device provided in the third aspect, the computer storage medium provided in the fourth aspect, the chip provided in the fifth aspect, and the computer program product provided in the sixth aspect are all configured to perform the method provided in embodiments of this application. Therefore, for beneficial effects that can be achieved by the method, refer to beneficial effects in the corresponding method. Details are not described herein again.

DESCRIPTION OF EMBODIMENTS

The technical solutions according to embodiments of this application are clearly and completely described in the following with reference to the accompanying drawings. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Figure 1:
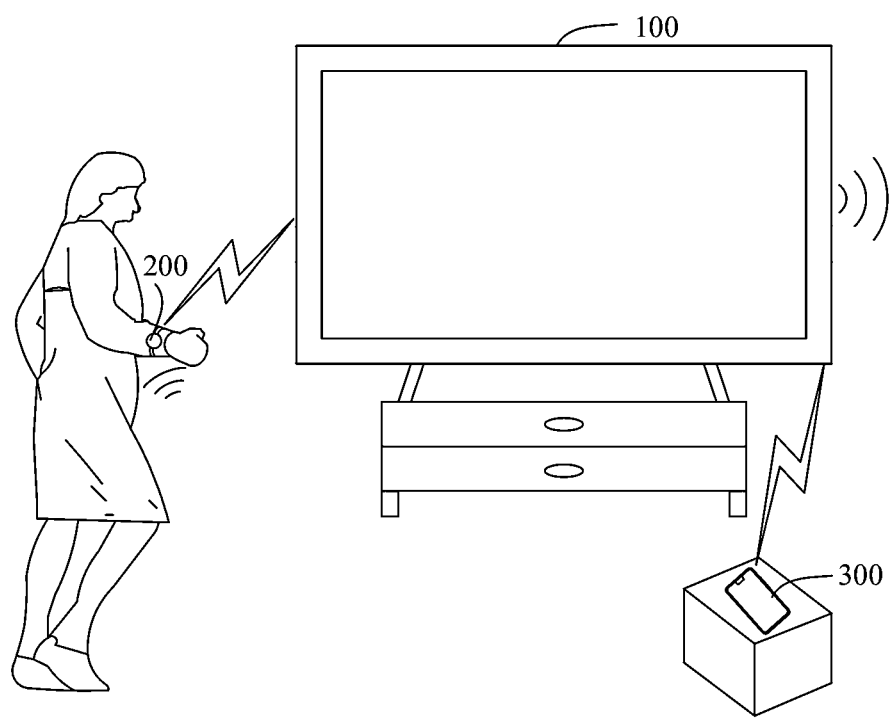
FIG. 1 is a schematic diagram of a sound effect adjustment scenario according to an embodiment of this application.

This application provides a sound effect adjustment method. As shown in FIG. 1, in this method, a first electronic device 100 (for example, a television) that plays first audio may establish a communication connection, for example, a Bluetooth connection or a wireless fidelity (wireless fidelity, Wi-Fi) connection, to a nearby electronic device. A communication connection is established between the first electronic device 100 and a second electronic device 200. The second electronic device 200 is a device (for example, a watch) carried by a user. A microphone is disposed in the second electronic device 200. In a process of playing the first audio, the first electronic device 100 may indicate the second electronic device 200 to start up the microphone to collect an ambient sound. The ambient sound is an ambient sound at a location of the user. The ambient sound may include a sound of playing the first audio by the first electronic device 100 and ambient noise at the location of the user. A communication connection may further be established between the first electronic device 100 and a third electronic device 300 (for example, a mobile phone). The third electronic device 300 includes a sound effect evaluation module. The third electronic device 300 may obtain the first audio played by the first electronic device 100 and ambient audio obtained by the second electronic device 200 by collecting the ambient sound. Based on the first audio and the ambient audio, the sound effect evaluation module in the third electronic device 300 may evaluate whether a listening sound effect of the first audio at the location of the user reaches an optimal sound effect. The optimal sound effect may be a sound effect of the audio played by the first electronic device 100 at an optimal listening location and in a quiet environment. The optimal listening location may be a location with an optimal hearing feeling when the audio played by the first electronic device is listened to. The quiet environment may be an environment in which loudness of ambient noise is smaller than a preset loudness. Further, the first electronic device 100 may adjust a playback sound effect of the first audio based on an evaluation result of the sound effect evaluation module, so that the listening sound effect of the first audio at the location of the user reaches the optimal sound effect.

The first audio may be audio of music, audio of a video, audio in a voice call, audio in a video call, or the like. A source of the first audio is not specifically limited in this embodiment of this application.

The first electronic device 100 may include a sound effect evaluation module. In other words, the third electronic device 300 and the first electronic device 100 may be a same electronic device. After indicating the second electronic device 200 to collect the ambient sound, the first electronic device 100 may receive the ambient audio from the second electronic device 200. The first electronic device 100 may adjust the playback sound effect of the first audio based on an evaluation result obtained by the sound effect evaluation module of the first electronic device 100.

The second electronic device 200 may alternatively have a sound effect evaluation module. In other words, the third electronic device 300 and the second electronic device 200 may be a same electronic device. After indicating the second electronic device 200 to collect the ambient sound, the first electronic device 100 may send the played first audio to the second electronic device 200. The second electronic device 200 may send, to the first electronic device 100, an evaluation result obtained by the sound effect evaluation module of the second electronic device 200. Further, the first electronic device 100 may adjust the playback sound effect of the first audio based on the evaluation result.

It can be learned from the foregoing method that the first electronic device that plays the first audio may collect, by using the second electronic device carried by a user, an ambient sound at a location of the user. Based on the first audio and an evaluation result of ambient audio at the location of the user, the first electronic device may determine a listening sound effect of the first audio at the location of the user. The first electronic device may adjust the playback sound effect of the first audio, so that the listening sound effect of the first audio at the location of the user reaches the sound effect at the optimal listening location and in the quiet environment. In other words, in a process of playing audio by the first electronic device, a sound effect (namely, the listening sound effect) heard by the user may not be affected by a factor such as a change of a distance between the user and the first electronic device, a change of an angle, or a change of ambient noise. The first electronic device may dynamically adjust the playback sound effect of the first audio based on a change of a location environment of the user, to improve audio listening experience of the user.

To facilitate understanding of the sound effect adjustment method in embodiments of this application, concepts related to a sound effect in embodiments of this application are described herein.

1. Playback Sound Effect

A sound effect may be an effect of a sound. The playback sound effect may be a sound effect of audio that is output by an audio output apparatus in an electronic device. The electronic device may adjust the playback sound effect by changing loudness (namely, a sound volume) or adjusting an audio parameter such as a parameter in an equalizer (equalizer, EQ) of an audio signal and a parameter in a dynamic range controller (dynamic range controller, DRC).

The parameter in the EQ may include a filter type (for example, a low-pass filter or a high-pass filter), a center frequency (center frequency), a gain (gain), a quality factor (quality factor), or the like. The parameters in the DRC may include a frequency band range, a signal threshold, a compression rate, a signal gain, or the like.

An adjusted sound effect in the sound effect adjustment method mentioned in embodiments of this application may be the playback sound effect.

In embodiments of this application, the audio parameter adjusted when the electronic device adjusts the playback sound effect is not limited, and the audio parameter that is for changing the playback sound effect may alternatively be another audio parameter.

2. Listening Sound Effect

The listening sound effect may be a sound effect that is of audio played by an electronic device and that is heard by an ear of a user. The listening sound effect is mainly determined based on the playback sound effect. The listening sound effect is also affected by a factor such as a distance between the user and the electronic device, an angle, and ambient noise.

It may be understood that the playback sound effect may be a listening sound effect heard when a distance between the user and an audio playback device approaches zero.

The electronic device may adjust the playback sound effect, so that the listening sound effect of the user is always an optimal sound effect or is close to the optimal sound effect. In this way, impact that is of the factor such as the distance between the user and the electronic device, the angle, and the ambient noise and that is on the listening sound effect of the user can be reduced, and listening experience of listening to the audio by the user can be improved.

3. Optimal Sound Effect

The optimal sound effect may be a sound effect of audio played by an electronic device at an optimal listening location and in a quiet environment. It may be understood that the optimal sound effect may be a listening sound effect with optimal listening experience when a user listens to the audio played by the electronic device.

In a possible implementation, the electronic device may store an optimal sound effect mapping table. The optimal sound effect mapping table may include a correspondence between playing different audio at different playback sound effects and a value of the audio parameter at the optimal sound effect. For example, the electronic device plays the first audio when the audio parameter is a first parameter (for example, loudness is 10 decibels, and a parameter of the EQ and a parameter of the DRC are preset parameters). The electronic device may determine, based on the optimal sound effect mapping table, that an audio parameter of the first audio at the optimal sound effect is a second parameter. A value of the audio parameter at the optimal sound effect may be preset when the electronic device is delivered from a factory. Specific values of the values may be determined based on professional knowledge of adjusting an audio parameter in a conventional technology. This is not limited in embodiments of this application.

The optimal sound effect mapping table may alternatively be stored in a cloud server, and the electronic device may obtain the optimal sound effect mapping table from the cloud server.

In another possible implementation, the electronic device may determine a value of the audio parameter at the optimal sound effect by using an optimal sound effect calculation algorithm. The optimal sound effect calculation algorithm may indicate a correspondence between playing different audio at different sound effects and the value of the audio parameter at the optimal sound effect. The optimal sound effect calculation algorithm may be determined based on a professional indication for adjusting the audio parameter in a conventional technology. This is not limited in this embodiment of this application.

In this embodiment of this application, the first electronic device 100 is an electronic device having an audio playback capability. The first electronic device 100 may be a television, a sound box, a mobile phone, a tablet computer, a notebook computer, an ultra-mobile personal computer (ultra-mobile personal computer, UMPC), a handheld computer, a netbook, a personal digital assistant (personal digital assistant, PDA), a portable multimedia player (portable multimedia player, PMP), a dedicated media player, or the like.

The second electronic device 200 is an electronic device that can be carried by a user and has a sound collection capability. The second electronic device 200 may be a watch, a headset, a mobile phone, a PMP, or the like. The second electronic device 200 and the first electronic device 100 are not a same electronic device.

The third electronic device 300 is an electronic device that includes the sound effect evaluation module. The third electronic device 300 may be a television, a sound box, a mobile phone, a watch, a tablet computer, a notebook computer, a UMPC, a handheld computer, a netbook, a PDA, a PMP, a dedicated media player, or the like. The third electronic device 300 and the first electronic device 100 may be a same electronic device. Alternatively, the third electronic device 300 and the second electronic device 200 may be a same electronic device.

In addition to the electronic devices of the foregoing listed types, the first electronic device 100, the second electronic device 200, and the third electronic device 300 may alternatively be electronic devices of other types.

Figure 2:
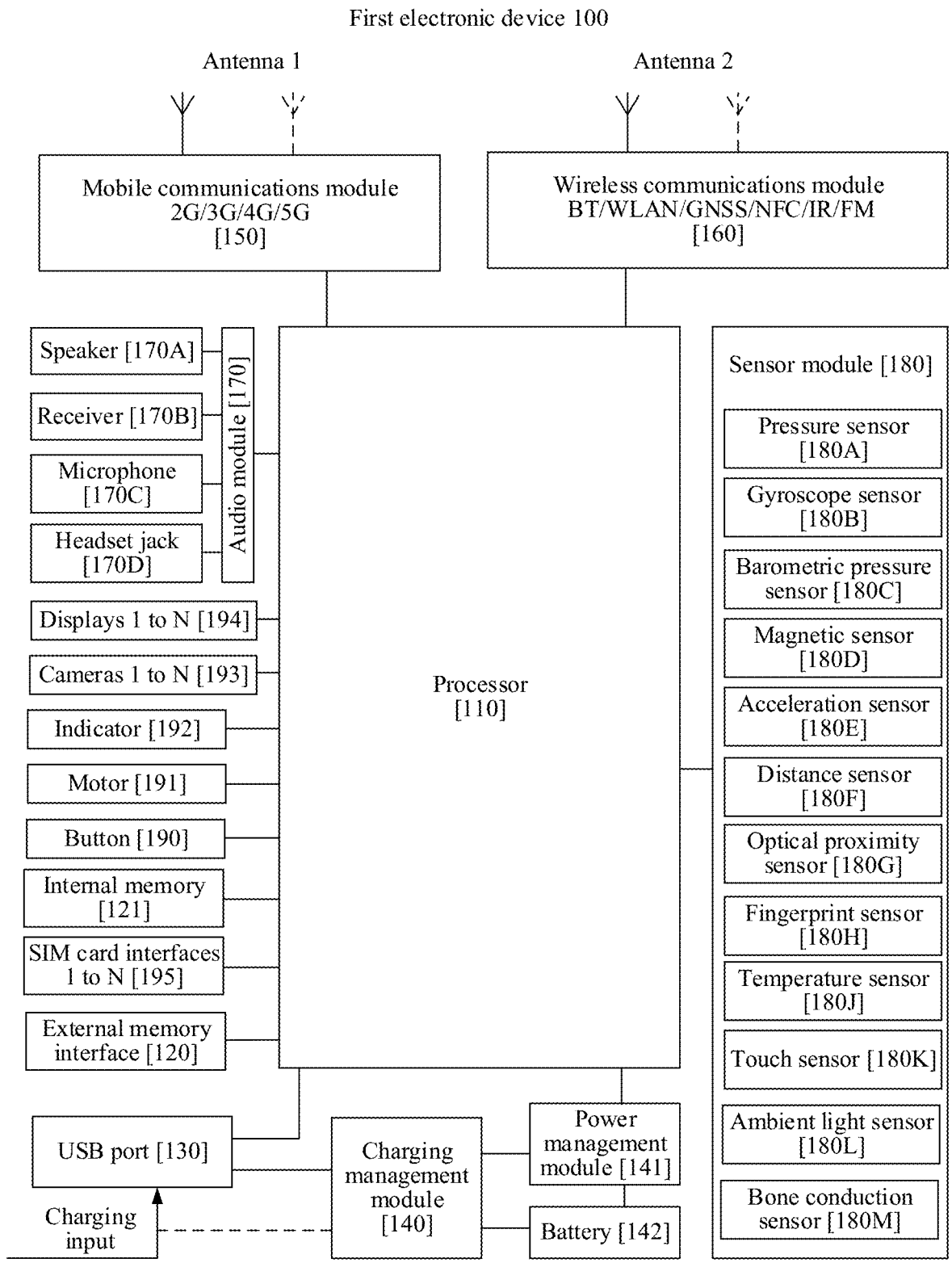
FIG. 2 is a schematic diagram of a structure of a first electronic device 100 according to an embodiment of this application.

FIG. 2 is a schematic diagram of a structure of a first electronic device 100.

The first electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the first electronic device 100. In some other embodiments of this application, the first electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

In some embodiments of this application, the processor 110 may include a sound effect evaluation module and a sound effect adjustment module. The sound effect evaluation module and the sound effect adjustment module may be integrated into different processor chips, and are executed by different chips. For example, the sound effect evaluation module may be integrated into an NPU or another chip. The sound effect adjustment module may be integrated into a DSP chip. In this way, after the sound effect evaluation module obtains a sound effect evaluation result based on first audio played by the first electronic device 100 and ambient audio collected by another electronic device, the chip in which the sound effect adjustment module is located may be invoked to adjust a playback sound effect of the first audio based on the sound effect evaluation result, to reduce energy consumption. Optionally, the sound effect evaluation module and the sound effect adjustment module may be integrated into a same processor chip, and a same chip performs a related function. For example, both the sound effect evaluation module and the sound effect adjustment module may be integrated into a DSP chip.

The sound effect evaluation module may perform sound source separation on the ambient audio. Specifically, the sound effect evaluation module may divide the ambient audio into two parts: a played audio part and a background noise part. The played audio part may be audio corresponding to a sound of the first audio that is played by the first electronic device 100 and that is collected by the electronic device that collects an ambient sound. Further, the sound effect evaluation module may evaluate an audio signal of the first audio at an optimal sound effect and an audio signal of the played audio part, to obtain a sound effect evaluation result. The sound effect evaluation result may indicate a difference between a listening sound effect of a user and the optimal sound effect. The sound effect evaluation module may send the sound effect evaluation result to the sound effect adjustment module.

The sound effect adjustment module may obtain a value range of each of the foregoing audio parameters of the first audio played by the first electronic device 100 at the optimal sound effect. The sound effect adjustment module may adjust, based on the sound effect evaluation result from the sound effect evaluation module, a playback sound effect of playing the first audio. To be specific, the sound effect adjustment module may adjust an audio parameter such as loudness, a parameter in an EQ, and a parameter in a DRC, so that a value of each audio parameter of the audio signal in the played audio part reaches the value range of each of the audio parameters of the first audio at the optimal sound effect.

In a possible implementation, the sound effect adjustment module may further obtain an audio signal of the background noise part. A larger amplitude of the audio signal of the background noise part (namely, louder background noise) indicates a greater adjustment amount of loudness that is of the first audio and that is adjusted by the sound effect adjustment module in a playback process.

Further, the sound effect adjustment module may hand over an adjusted audio signal to the speaker 170A. The speaker 170A may output a sound.

A memory may be further disposed in the processor 110, and is configured to store instructions and data. In some embodiments, the memory in the processor 110 is a cache memory. The memory may store instructions or data that has been used or cyclically used by the processor 110. If the processor 110 requires to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL).

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170.

The PCM interface may also be used to perform audio communication, and sample, quantize, and code an analog signal. In some embodiments, the audio module 170 may be coupled to the wireless communications module 160 through a PCM bus interface.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function.

It may be understood that an interface connection relationship between the modules that is shown in this embodiment of the present invention is merely an example for description, and constitutes no limitation on the structure of the first electronic device 100. In some other embodiments of this application, the first electronic device 100 may alternatively use an interface connection mode different from that in the foregoing embodiment, or use a combination of a plurality of interface connection modes.

The charging management module 140 is configured to receive charging input from a charger.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like.

A wireless communication function of the first electronic device 100 may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the first electronic device 100 may be configured to cover one or more communication bands. Different antennas may be further multiplexed, to improve antenna utilization.

The mobile communications module 150 can provide a wireless communication solution that is applied to the first electronic device 100 and that includes 2G/3G/4G/5G or the like. In some embodiments, at least some functional modules of the mobile communications module 150 may be disposed in a same device as at least some modules of the processor 110.

The wireless communications module 160 may provide a wireless communication solution that is applied to the first electronic device 100 and that includes a wireless local area network (wireless local area networks, WLAN) (for example, a Wi-Fi network), Bluetooth, a global navigation satellite system (global navigation satellite system, GNSS), frequency modulation (frequency modulation, FM), near field communication (near field communication, NFC), an infrared technology (infrared, IR), or the like.

In some embodiments of this application, when detecting an audio playing instruction, the processor 110 may indicate the wireless communications module 160 to start one or more of the foregoing wireless communication solutions, so that the first electronic device 100 establishes a communication connection to a nearby electronic device. For example, the processor 110 may indicate the wireless communications module 160 to start Bluetooth communication, so that the first electronic device 100 establishes a Bluetooth connection to a nearby Bluetooth device. Alternatively, the processor 110 may indicate the wireless communications module 160 to enable Wi-Fi network communication, so that the first electronic device 100 establishes a communication connection to an electronic device accessing same home Wi-Fi.

The first electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. In some embodiments, the first electronic device 100 may include one or N displays 194, where N is a positive integer greater than 1.

The first electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image.

The camera 193 is configured to capture a static image or a video. In some embodiments, the first electronic device 100 may include one or N cameras 193, where N is a positive integer greater than 1.

The digital signal processor is configured to process a digital signal, and may further process another digital signal such as a digital audio signal in addition to a digital image signal. For example, when the first electronic device 100 selects a frequency, the digital signal processor is configured to perform Fourier transformation on frequency energy.

The NPU is a neural network (neural network, NN) computing processor. The NPU quickly processes input information based on a structure of a biological neural network, for example, based on a transfer mode between human brain neurons; and may further continuously perform self-learning. An application such as intelligent cognition, for example, sound source separation, image recognition, facial recognition, speech recognition, and text understanding of the first electronic device 100 may be implemented by using the NPU.

The external memory interface 120 may be configured to connect to an external memory card, for example, a micro SD card, to expand a storage capability of the first electronic device 100.

The internal memory 121 may be configured to store computer-executable program code. The executable program code includes instructions. The processor 110 executes various function applications and data processing of the first electronic device 100 by running the instructions stored in the internal memory 121.

The first electronic device 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The first electronic device 100 may be used to listen to music or answer a call in a hands-free mode through the speaker 170A.

The receiver 170B, also referred to as an "earpiece", is configured to convert an electrical audio signal into a sound signal. When a call is answered or voice information is received through the first electronic device 100, the receiver 170B may be put close to a human ear to listen to a voice.

The microphone 170C, also referred to as a "mike" or a "mic", is configured to convert a sound signal into an electrical signal. At least one microphone 170C may be disposed in the first electronic device 100. In some other embodiments, two microphones 170C may be disposed in the first electronic device 100, to collect a sound signal and implement a noise reduction function. In some other embodiments, three, four, or more microphones 170C may alternatively be disposed in the first electronic device 100, to collect a sound signal, implement noise reduction, and identify a sound source, to implement a directional recording function and the like.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194.

The gyroscope sensor 180B may be configured to determine a motion posture of the first electronic device 100. In some embodiments, an angular velocity of the first electronic device 100 around three axes (namely, axes x, y, and z) may be determined by using the gyroscope sensor 180B.

The acceleration sensor 180E may detect accelerations in various directions (usually on three axes) of the first electronic device 100. When the first electronic device 100 is still, the acceleration sensor 180E may detect a magnitude and a direction of gravity.

The fingerprint sensor 180H is configured to collect a fingerprint. The first electronic device 100 may use a feature of the collected fingerprint to implement fingerprint-based unlocking, application lock accessing, fingerprint-based photographing, fingerprint-based call answering, and the like.

The touch sensor 180K is also referred to as a touch panel. The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transfer the detected touch operation to the application processor to determine a type of the touch event.

The bone conduction sensor 180M may obtain a vibration signal. In some embodiments, the bone conduction sensor 180M may obtain a vibration signal of a vibration bone of a human vocal-cord part.

The button 190 includes a power button, a volume button, and the like. The first electronic device 100 may receive a button input, and generate a button signal input related to a user setting and function control of the first electronic device 100.

The motor 191 may generate a vibration prompt. The motor 191 may be configured to provide an incoming call vibration prompt and a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card. The first electronic device 100 interacts with a network through the SIM card, to implement a call function, a data communication function, and the like. In some embodiments, the first electronic device 100 uses an eSIM, namely, an embedded SIM card. The eSIM card may be embedded in the first electronic device 100, and cannot be separated from the first electronic device 100.

Not limited to the modules shown in FIG. 2, the first electronic device 100 may further include more or fewer components. The structure of the electronic device shown in FIG. 2 may also be schematic diagrams of structures of the second electronic device 200 and the third electronic device 300. Not limited to the modules shown in FIG. 2, the second electronic device 200 or the third electronic device 300 may further include more or fewer components.

The following specifically describes an implementation process in which the first electronic device 100 establishes a communication connection to a nearby electronic device. An example in which the first electronic device 100 establishes a Bluetooth connection to a nearby electronic device is used for description.

In some embodiments, the first electronic device 100 may establish a Bluetooth connection to a nearby electronic device based on a received user operation.

For example, FIG. 3A to FIG. 3D are schematic diagrams in which the first electronic device 100 establishes a Bluetooth connection to the second electronic device 200.

Figure 3A:
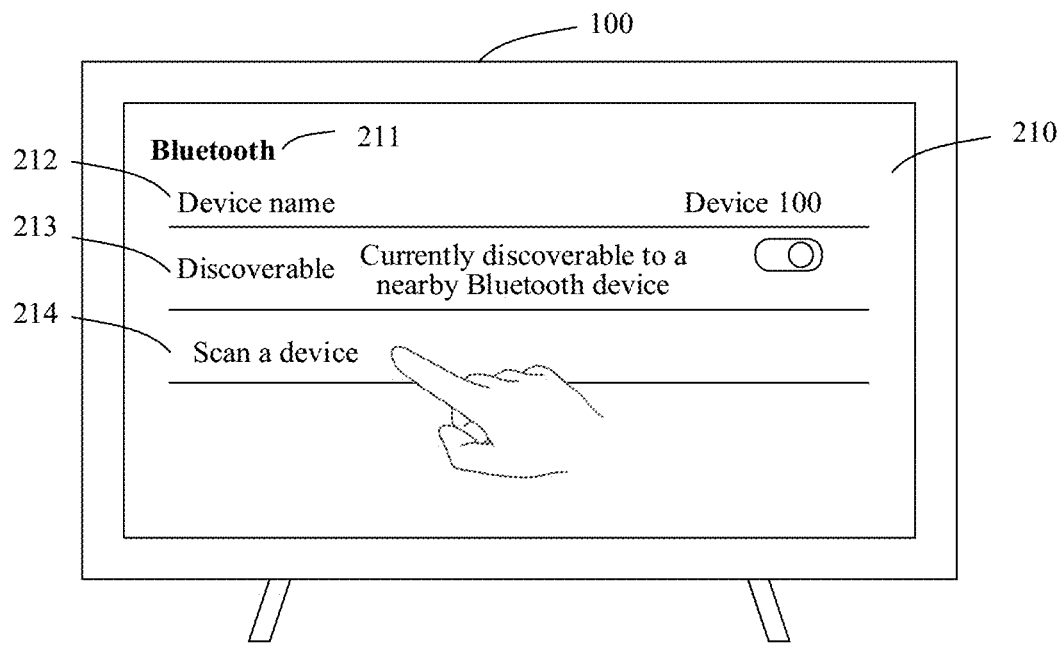
FIG. 3A to FIG. 3D are schematic diagrams of some user interfaces for establishing a communication connection between a first electronic device 100 and another electronic device according to an embodiment of this application.

As shown in FIG. 3A, the first electronic device 100 may display a Bluetooth setting interface 210. The Bluetooth setting interface 210 may include a title bar 211, a device name 212, a Bluetooth switching control 213, and a device scanning control 214.

The title bar 211 may include text information "Bluetooth". The title bar 211 may prompt a user that a user interface currently displayed by the first electronic device 100 is a user interface for setting Bluetooth.

The device name 211 may be a device name of the first electronic device 100. The device name of the first electronic device 100 may be "Device 100". When the first electronic device 100 establishes a Bluetooth connection to another electronic device, the another electronic device may display the device name of the first electronic device 100.

The Bluetooth switching control 213 may be for activating or deactivating Bluetooth of the first electronic device 100. As shown in FIG. 3A, the Bluetooth of the first electronic device 100 is in an activated state. Text information "Currently discoverable to a nearby Bluetooth device" may be displayed on the Bluetooth switching control 213.

The device scanning control 214 may be used by the first electronic device 100 to scan a nearby Bluetooth device. The Bluetooth device may be an electronic device whose Bluetooth is in the activated state and that sends a broadcast data packet in a broadcast manner by using the Bluetooth.

In response to a user operation performed on the device scanning control 214, the first electronic device 100 may enter a scanning state, and receive a broadcast data packet sent by the nearby Bluetooth device. In this way, the first electronic device 100 may obtain information such as a device address and a device name of the nearby Bluetooth device.

Figure 3B:
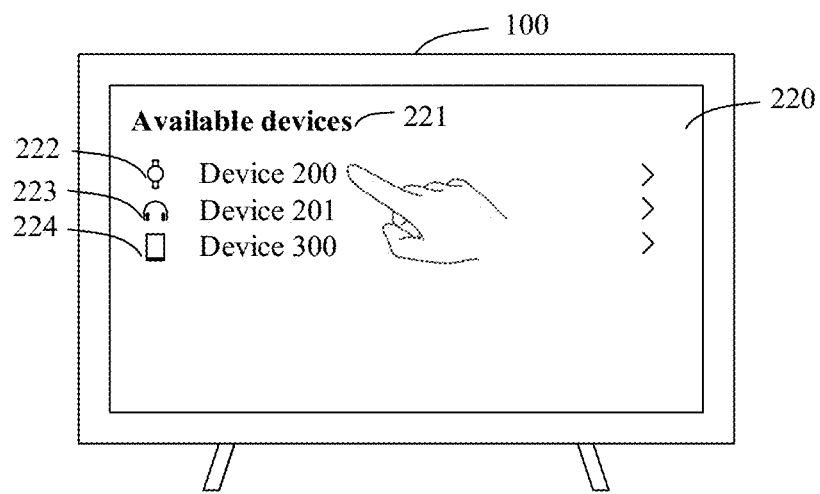

The first electronic device 100 may display a user interface 220 shown in FIG. 3B. The user interface 220 may display information about a Bluetooth device scanned by the first electronic device 100. The user interface 220 may include a title bar 221, a second electronic device indication control 222, a third electronic device indication control 224, and a fourth electronic device indication control 223.

The title bar 221 may include text information "Available devices". The title bar may prompt a user that an electronic device indicated by each device indication control in the current user interface of the first electronic device 100 is a device to which a Bluetooth connection can be established.

The second electronic device indication control 222, the third electronic device indication control 224, and the fourth electronic device indication control 223 may be respectively used by the first electronic device 100 to establish a Bluetooth connection to the second electronic device 200, the third electronic device 300, and a fourth electronic device 201.

In some embodiments, the first electronic device 100 may further obtain a device type of a scanned Bluetooth device. For example, the first electronic device obtains that a device type of the second electronic device 200 is a watch. The second electronic device indication control 222 may include an icon of the watch and a device name "Device 200" of the second electronic device 200. The first electronic device obtains that a device type of the third electronic device 300 is a mobile phone. The third electronic device indication control 224 may include an icon of the mobile phone and a device name "Device 300" of the third electronic device 300. The first electronic device obtains that a device type of the fourth electronic device 400 is a headset. The fourth electronic device indication control 223 may include an icon of the headset and a device name "Device 201" of the fourth electronic device 400.

In response to a user operation performed on the second electronic device indication control 222, the first electronic device 100 may send a Bluetooth connection request to the second electronic device 200. The Bluetooth connection request may be for requesting to establish a Bluetooth connection to the second electronic device 200.

Figure 3C:
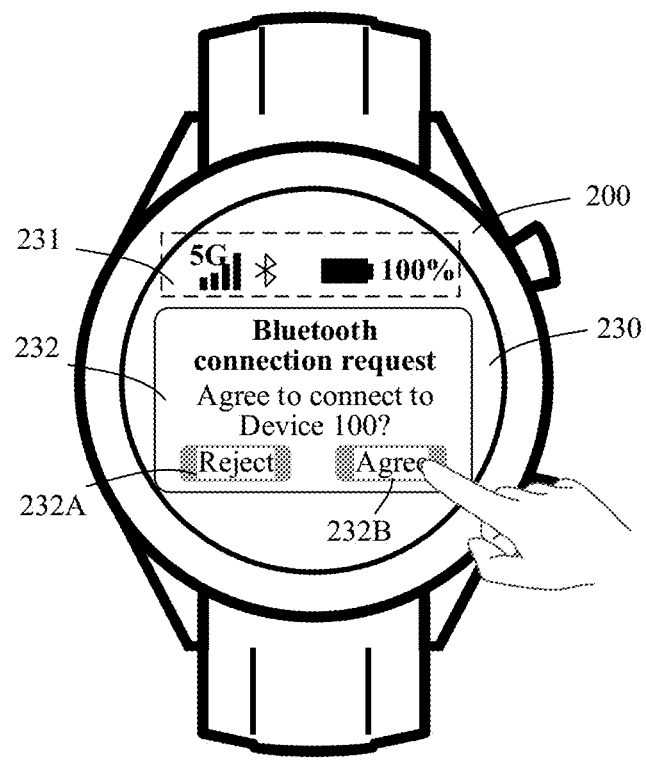

When receiving the Bluetooth connection request, the second electronic device 200 may display a user interface 230 shown in FIG. 3C. The user interface 230 may include a status bar 231 and a prompt box 232.

The status bar 231 may include a signal strength indicator of a mobile communication signal, a Bluetooth indicator, and a battery status indicator.

The prompt box 232 may prompt a user that the first electronic device 100 whose device name is "Device 100" requests to establish a Bluetooth connection. The prompt box 232 may include text information "Bluetooth connection request Agree to connect to Device 100?". The prompt box 232 may further include a "Reject" control 232A and an "Agree" control 232B. The "Reject" control 232A may be for rejecting establishment of a Bluetooth connection to the first electronic device 100. In response to a user operation performed on the "Reject" control 232A, the second electronic device 200 may send a connection rejection message to the first electronic device 100. The "Agree" control 232B may be for agreeing to establish a Bluetooth connection to the first electronic device 100. In response to a user operation performed on the "Agree" control 232B, the second electronic device 200 may send a connection agreement message to the first electronic device 100.

Figure 3D:
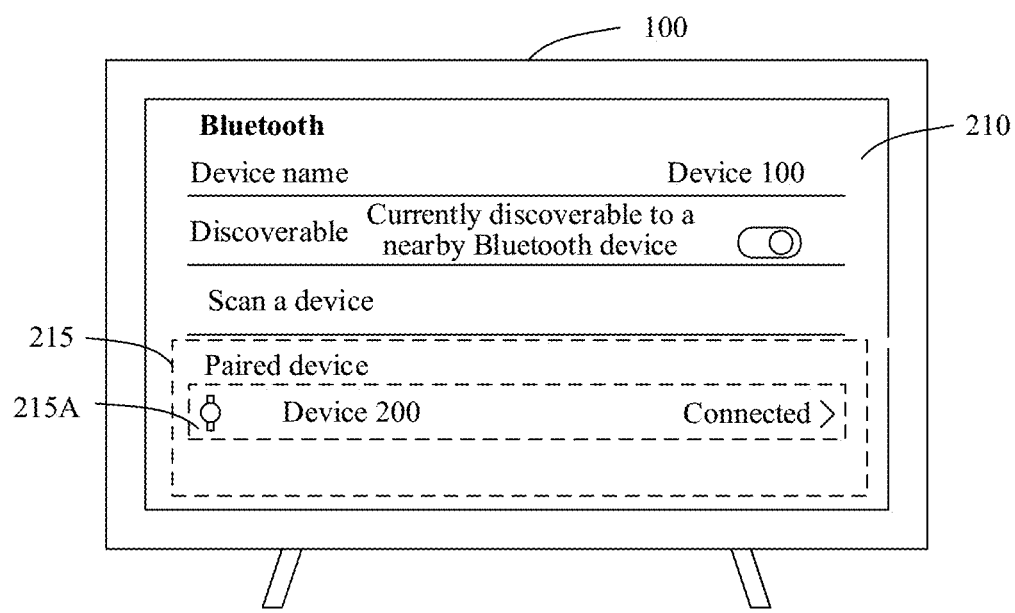

When receiving the connection agreement message from the second electronic device 200, the first electronic device 100 successfully establishes a Bluetooth connection to the second electronic device 200. As shown in FIG. 3D, the first electronic device 100 may display a paired device list 215 on a Bluetooth setting interface 210. The paired device list 215 may include an indicator of a device that current establishes a Bluetooth connection to the first electronic device 100, for example, a second electronic device indicator 215A. The second electronic device indicator 215A may include the icon of the device type (for example, the watch) of the second electronic device 200, the device name "Device 200", and a connection status prompt (for example, a text prompt "Connected"). The paired device list 215 may further include an indicator of a device that once established a Bluetooth connection to the first electronic device 100, but does not establish a Bluetooth connection to the first electronic device 100 currently.

The user interfaces shown in FIG. 3A to FIG. 3D are not limited in embodiments of this application. The user interfaces may alternatively include more or less content.

It can be learned from the foregoing scenarios shown in FIG. 3A to FIG. 3D that the first electronic device 100 may establish a Bluetooth connection to a nearby electronic device, for example, the second electronic device 200, the third electronic device 300, or the fourth electronic device 201, based on a user indication.

In some embodiments, one or more of the electronic devices such as the second electronic device 200, the third electronic device 300, and the fourth electronic device 201 may alternatively request, based on a received user operation, to establish a Bluetooth connection to the first electronic device 100.

In some embodiments, when detecting a user operation of playing the first audio, the first electronic device 100 may actively scan a nearby Bluetooth device and establish a Bluetooth connection.

The Bluetooth of the first electronic device 100 is in the activated state and scans a nearby Bluetooth device. Electronic devices scanned by the first electronic device 100 may include an electronic device that once established a Bluetooth connection to the first electronic device 100 and an electronic device that has never established a Bluetooth connection to the first electronic device 100.

The first electronic device 100 may store information (for example, a device name, a Bluetooth address, or a connection key) about the electronic device that once established a Bluetooth connection. The first electronic device 100 may re-establish, by using the foregoing information, a Bluetooth connection to the electronic device that once established a Bluetooth connection.

The first electronic device 100 may send a Bluetooth connection request to the electronic device that has never established a Bluetooth connection, and establish a Bluetooth connection to the electronic device after the electronic device replies with a connection agreement request. When receiving the Bluetooth connection request from the first electronic device 100, the electronic device may display, on a display, the prompt box 232 shown in FIG. 3C.

Alternatively, the electronic device does not include a display. The electronic device may prompt, in a manner such as a voice prompt, a user that the first electronic device 100 whose device name is "Device 100" requests to establish a Bluetooth connection.

In some embodiments, the first electronic device 100 may further obtain information about an audio collection apparatus (for example, a microphone) of each electronic device before establishing a Bluetooth connection to the scanned electronic devices. The first electronic device 100 may screen the electronic devices based on whether the electronic devices include the audio collection apparatus. The first electronic device 100 may establish a Bluetooth connection to an electronic device including the audio collection apparatus.

A process of establishing a Bluetooth connection between the electronic devices is not limited in embodiments of this application. The Bluetooth connection may be a classic Bluetooth (classic Bluetooth) connection or a Bluetooth low energy (Bluetooth low energy, BLE) connection. For a specific connection process, refer to a Bluetooth connection implementation process in a conventional technology.

Each user operation mentioned above and in subsequent embodiments is not limited in embodiments of this application. For example, the user may indicate, by touching a location of a control on a display, an electronic device (for example, the first electronic device 100, the second electronic device 200, or the third electronic device 300) to execute an instruction corresponding to the control (for example, scanning a Bluetooth device, or establishing a Bluetooth connection to another device). The user may alternatively control, by using a remote control, the electronic device to execute a corresponding instruction.

Not limited to the foregoing communication manner of the Bluetooth connection, in some embodiments, when detecting that the first audio starts to be played, alternatively, the first electronic device 100 may actively establish a communication connection to an electronic device in a same local area network. For example, the first electronic device 100 accesses home Wi-Fi. When detecting that the first audio starts to be played, the first electronic device 100 may actively establish a communication connection to another electronic device that accesses the home Wi-Fi, and communicate with the electronic device by using a Wi-Fi network. The first electronic device 100 may obtain, by using the Wi-Fi network, a device type of the electronic device and information about an audio collection apparatus.

In some embodiments, the first electronic device 100 may establish a communication connection to a nearby electronic device in a plurality of communication manners. For example, the first electronic device 100 may scan a nearby Bluetooth device, and establish a Bluetooth connection to an electronic device whose Bluetooth is in the activated state. The first electronic device 100 may alternatively establish, by using the Wi-Fi network, a communication connection to an electronic device that is in the same home Wi-Fi as the first electronic device 100 but that does not establish a Bluetooth connection.

A manner in which the first electronic device 100 establishes a communication connection to the nearby electronic device is not limited in embodiments of this application. For example, when detecting that the audio starts to be played, the first electronic device 100 may alternatively establish a communication connection to the nearby electronic device in a wireless local area network (wireless local area network, WLAN) direct connection manner. Further, the first electronic device 100 may request to collaborate with the electronic device that establishes the communication connection to the first electronic device 100, to obtain a listening sound effect of the played first audio at a location of a user.

The following specifically describes an implementation process in which the first electronic device 100 requests an electronic device that establishes a communication connection to start up a microphone, to obtain ambient audio.

In some embodiments, the first electronic device 100 may determine, based on an electronic device selected by a user, the second electronic device 200 configured to collect an ambient sound.

For example, FIG. 4A to FIG. 4D are schematic diagrams in which the first electronic device 100 determines the second electronic device 200 configured to collect the ambient sound.

Figure 4A:
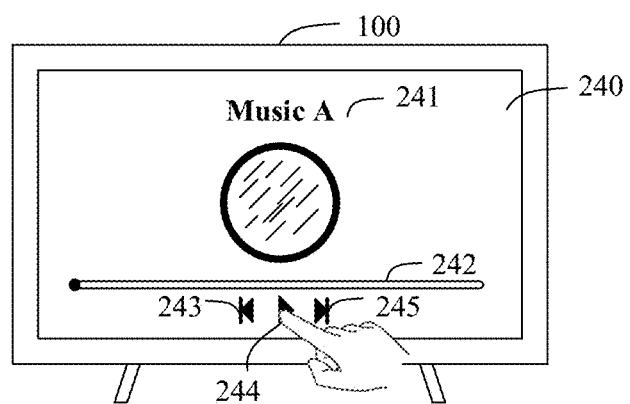
FIG. 4A to FIG. 4D are schematic diagrams of user interfaces of some electronic devices that determine to collect an ambient sound in a sound effect adjustment process according to an embodiment of this application.

As shown in FIG. 4A, the first electronic device 100 may receive a user operation of playing music A (namely, the first audio). The first electronic device 100 may display a user interface 240 shown in FIG. 4A. The user interface 240 may display content played by the first electronic device. The user interface 240 may include a music name 241, a playback progress bar 242, a previous-song control 243, a playback control 244, and a next-song control 245.

The music name 241 may be "music A". Content of the music name 241 is not limited in this embodiment of this application. The music name 241 may indicate that content that can be played by the first electronic device 100 is the music A.

The playback progress bar 242 may be for comparing played duration of music and total duration of the music, to indicate a music playback progress.

The previous-song control 243 may be used by the first electronic device 100 to play previous music of the music A.

The next-song control 245 may be used by the first electronic device 100 to play next music of the music A.

The playback control 244 may be used by the first electronic device 100 to play the music A. The foregoing user operation of playing the music A is a user operation performed on the playback control 244.

Figure 4B:
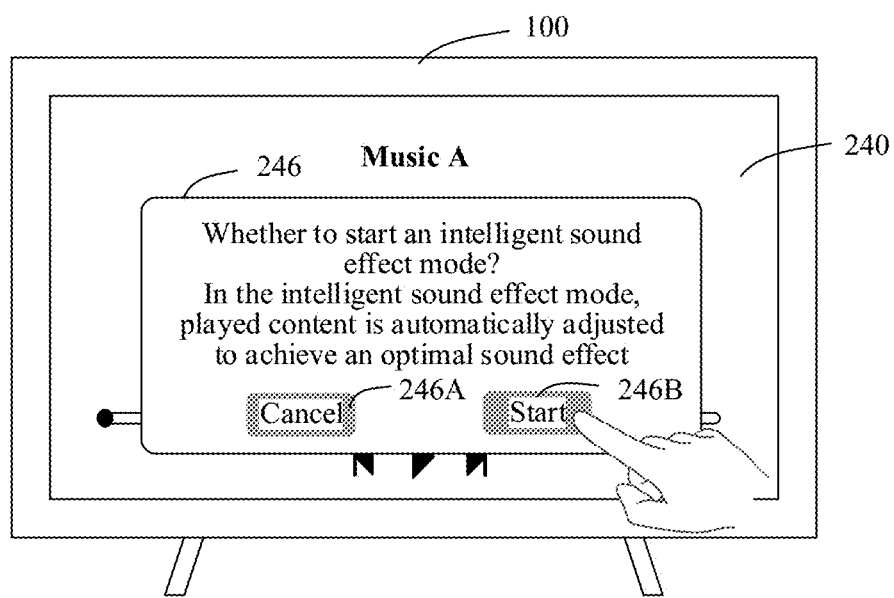

As shown in FIG. 4B, in response to the user operation performed on the playback control 244, the first electronic device 100 may display a prompt box 246 on the user interface 240. The prompt box 246 may be for querying a user whether to start an intelligent sound effect mode. In the intelligent sound effect mode, the first electronic device 100 may perform the sound effect adjustment method in embodiments of this application, to dynamically adjust a playback sound effect of the music A.

The prompt box 246 may include a prompt "Whether to start an intelligent sound effect mode? In the intelligent sound effect mode, played content is automatically adjusted to achieve an optimal sound effect". Specific content of the prompt is not limited in this embodiment of this application.

The prompt box 246 may further include a "Cancel" control 246A and a "Start" control 246B. The "Cancel" control 246A may be for rejecting starting the intelligent sound effect mode. In response to a user operation performed on the "Cancel" control 246A, the first electronic device 100 may start to play the music A based on a preset playback sound effect. The preset playback sound effect may mean that an audio parameter in a process of playing the audio is preset when the first electronic device 100 is delivered from a factory. When the first electronic device 100 starts to play the music based on the preset playback sound effect, the user has optimal listening experience at an optimal listening location and in a quiet environment. Alternatively, the preset playback sound effect may mean that a part (for example, loudness) of audio parameters in a process of playing the audio are set by the user, and the other part of the audio parameters are preset when the first electronic device 100 is delivered from a factory.

The "Start" control 246B may be for starting the intelligent sound effect mode.

Figure 4C:
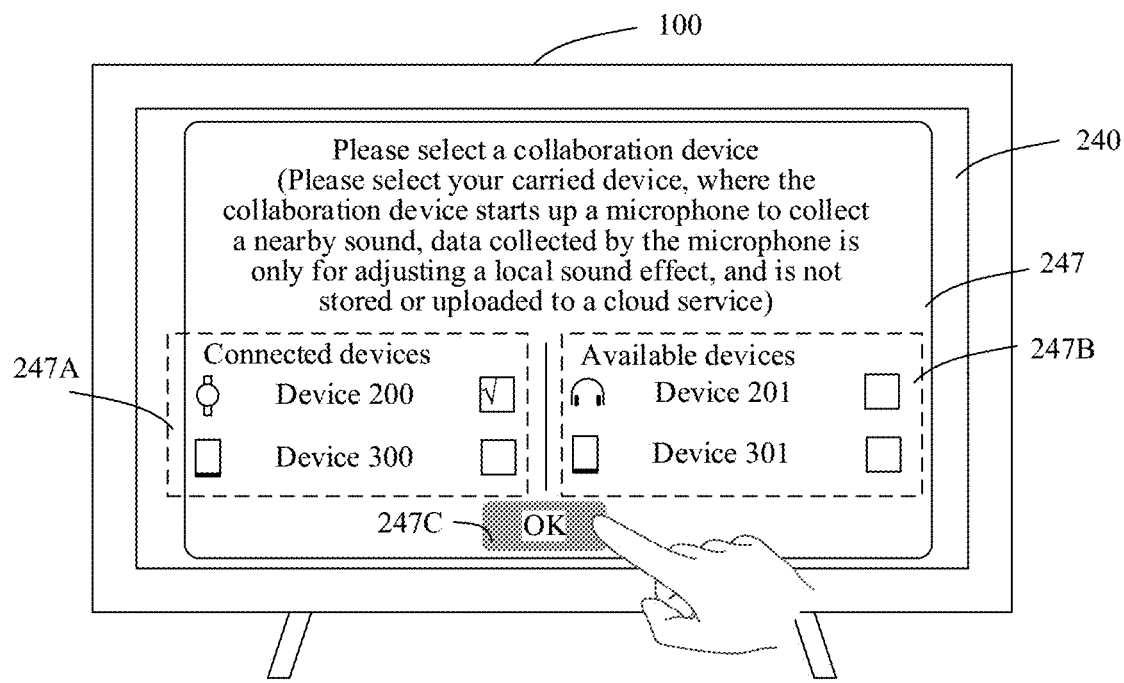

As shown in FIG. 4C, in response to a user operation performed on the "Start" control 246B, the first electronic device 100 may display a device option box 247 on the user interface. The device option box may be used by the user to select an electronic device that collects an ambient sound at a location of the user.

The device option box 247 may include a prompt "Please select a collaboration device (Please select your carried device, where the collaboration device starts up a microphone to collect a nearby sound, data collected by the microphone is only for adjusting a local sound effect, and is not stored or uploaded to a cloud service)". The prompt may prompt the user to select a device carried by the user as the collaboration device, to assist the first electronic device 100 in dynamically adjusting the playback sound effect of the audio. The selected electronic device starts up an audio collection apparatus (for example, the microphone) to collect an ambient sound. Specific content of the prompt is not limited in this embodiment of this application.

The device option box 247 may further include a "Connected devices" option 247A, an "Available devices" option 247B, and an "OK" control 247C.

The "Connected devices" option 247A may include a control for selecting an electronic device that current establishes a communication connection to the first electronic device 100. For example, the first electronic device 100 establishes a communication connection to the second electronic device 200 whose device name is "Device 200" and the third electronic device 300 whose device name is "Device 300". The "Connected devices" option 247A may include a second electronic device selection control and a third electronic device selection control. The electronic device selection control may include an icon of a device type, a device name, and a check box. That the check box is empty may indicate that an electronic device corresponding to the check box is in an unselected state. That the check box includes "✓" may indicate that the electronic device corresponding to the check box is in a selected state.

When one or more electronic devices corresponding to the electronic device selection controls in the "Connected devices" option 247A are in the selected state, and the first electronic device 100 detects a user operation performed on the "OK" control 247C, the first electronic device 100 may send, to the one or more electronic devices, an instruction that is for starting up an audio collection apparatus to collect an ambient sound.

The "Available devices" option 247B may include a control for selecting an electronic device that is discovered by the first electronic device 100 and that can establish a communication connection, but that does not establish a communication connection currently. For example, when scanning a nearby Bluetooth device, the first electronic device 100 discovers the fourth electronic device 201 (for example, the headset) whose device name is "Device 201" and a fifth electronic device 301 (for example, a mobile phone) whose device name is "Device 301". The first electronic device 100 has never established a Bluetooth connection to the fourth electronic device 201 or the fifth electronic device 301. The "Available devices" device option 247B may include a fourth electronic device selection control and a fifth electronic device selection control.

When one or more electronic devices corresponding to the electronic device selection controls in the "Connected devices" option 247B are in the selected state, and the first electronic device 100 detects a user operation performed on the "OK" control 247C, the first electronic device 100 may first establish a communication connection to the one or more electronic devices. For example, the first electronic device 100 may send a Bluetooth connection request to the one or more electronic devices, and establish a Bluetooth connection to the one or more electronic devices after receiving connection agreement messages returned by the one or more electronic devices. After receiving the Bluetooth connection request from the first electronic device 100, the one or more electronic devices may display the prompt box 232 shown in FIG. 3C, or prompt, in a manner such as a voice prompt, the user that the first electronic device 100 requests to establish a Bluetooth connection.

When the first electronic device 100 establishes a communication connection to the one or more electronic devices, the first electronic device 100 may send, to the one or more electronic devices, an instruction that is for starting up an audio collection apparatus to collect an ambient sound.

In other words, the user may select the one or more electronic devices corresponding to the electronic device selection controls in the "Connected devices" option 247A and the "Available devices" option 247B as the collaboration devices.

For example, when receiving a user operation performed on the "OK" control 247C, the first electronic device 100 determines that the second electronic device 200 corresponding to the second electronic device selection control is in the selected state. The first electronic device 100 may send, to the second electronic device 200, the instruction that is for starting up an audio collection apparatus to collect an ambient sound. After receiving the foregoing instruction, the second electronic device 200 may start up an audio collection apparatus to collect an ambient sound at a location of the second electronic device 200, to obtain ambient audio.

Figure 4D:
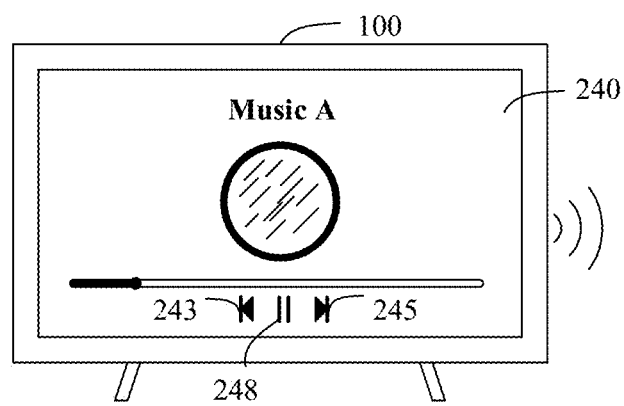

In addition, the first electronic device 100 may start to play audio (for example, the music named "music A"), and display a user interface 240 shown in FIG. 4D. In FIG. 4D, the user interface 240 may include a previous-song control 243, a next-song control 245, and a playback pause control 248. The playback pause control 248 may be used by the first electronic device 100 to pause playing the music A.

Content included in the user interfaces shown in FIG. 4A to FIG. 4D is not limited in embodiments of this application. The foregoing user interfaces may alternatively include more or less content. A scenario in which the first electronic device 100 plays audio is not limited to the foregoing audio playback scenario, and may alternatively be a scenario in which an audio output apparatus (for example, a speaker) outputs audio, such as video playback, a voice call, or a video call.

The first electronic device 100 may adjust a playback sound effect of the first audio based on a sound effect evaluation result obtained based on the first audio played by the first electronic device 100 and the ambient audio collected by the second electronic device 200 in a first time period, so that a listening sound effect of the user is not affected by a factor such as a change of the location of the user and a change of noise in an environment in which the user is located.

A sound effect evaluation method and a method in which the first electronic device 100 adjusts the playback sound effect of the first audio based on the sound effect evaluation result are specifically described in subsequent embodiments, and details are not described herein.

In some embodiments, when detecting that the audio starts to be played, the first electronic device 100 may determine that the intelligent sound effect mode is in a started state. In this case, the first electronic device 100 may display the user interface 240 shown in FIG. 4C, to indicate the user to select the collaboration device to collect the ambient sound at the location of the user. In other words, the first electronic device 100 may no longer display the user interface shown in FIG. 3B, and query the user whether to start the intelligent sound effect mode.

In some embodiments, the first electronic device 100 may determine, based on a device type, an electronic device with a highest possibility that a user carries the electronic device in electronic devices that each establish a communication connection to the first electronic device 100, and indicate the electronic device to collect an ambient sound.

The first electronic device 100 may store a first priority rule. In various types of electronic devices, a wearable device (for example, a watch) has a highest possibility of being carried by the user. Second, an electronic device carried by the user may alternatively be a mobile phone. The first priority rule may be that a priority of the wearable device is higher than a priority of the mobile phone. In other words, when the electronic devices that each establish a communication connection to the first electronic device 100 include the watch and the mobile phone, the first electronic device 100 may preferentially send, to the watch, an instruction that is for starting up an audio collection apparatus to collect an ambient sound.

Specific content of the first priority rule is not limited in this embodiment of this application. The foregoing first priority rule may be preset in a memory when the first electronic device 100 is delivered from a factory. Alternatively, the first priority rule may be set by the user.

Figure 5A:
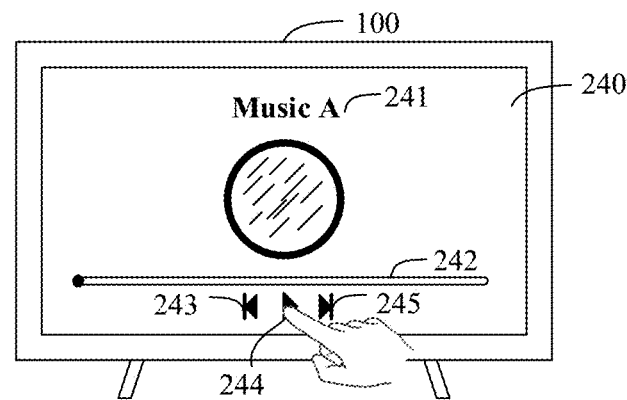
FIG. 5A and FIG. 5B are schematic diagrams of user interfaces of some other electronic devices that determine to collect an ambient sound in a sound effect adjustment process according to an embodiment of this application.
Figure 5B:
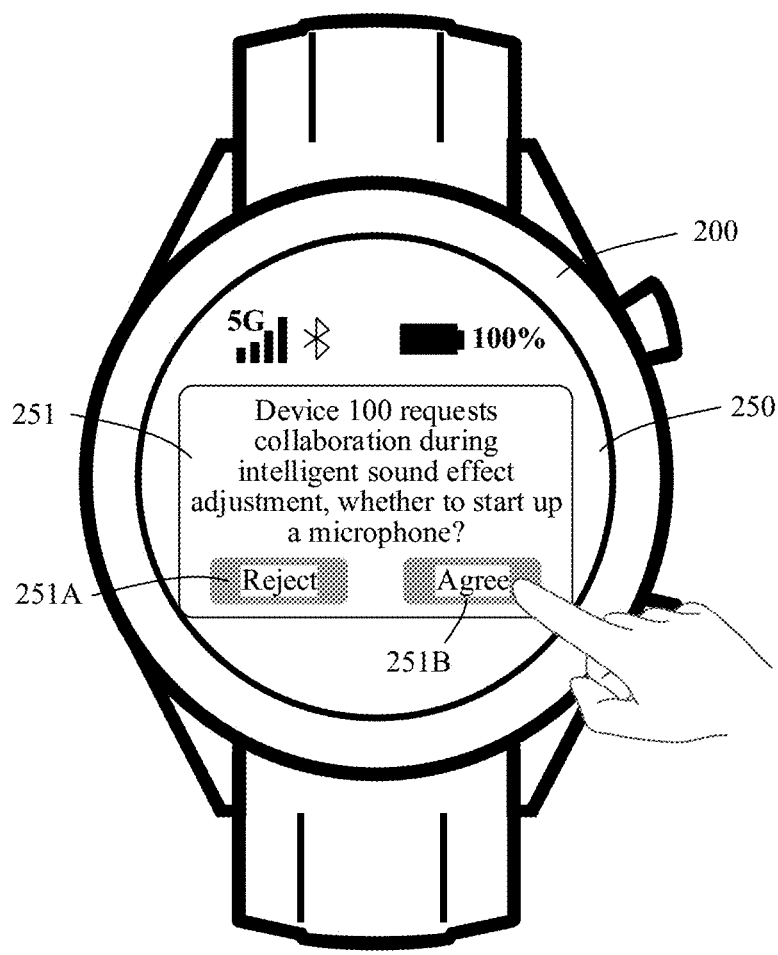

For example, FIG. 5A and FIG. 5B are schematic diagrams in which the first electronic device 100 indicates the second electronic device 200 to start up an audio collection apparatus.

As shown in FIG. 5A, the first electronic device 100 may receive a user operation of playing music A. The first electronic device 100 may display a user interface 240 shown in FIG. For content included in the user interface 240, refer to descriptions of the user interface 240 shown in FIG. 4A. Details are not described herein again.

When receiving the user operation of playing the music A, the first electronic device 100 may start to play the music A. In addition, the first electronic device 100 may determine, based on the first priority rule, an electronic device with a highest priority in electronic devices that currently establish a communication connection to the first electronic device 100. The first electronic device 100 may determine that a priority of the second electronic device 200 (namely, a watch) is the highest. The first electronic device 100 may send, to the second electronic device 200, an instruction that is for starting up an audio collection apparatus.

When receiving the instruction that is for starting up an audio collection apparatus, the second electronic device 200 may display a user interface 250 shown in FIG. 5B. The user interface 250 may include a prompt box 251. The prompt box 251 may be for querying the user whether to start up a microphone of the second electronic device 200.

The prompt box 251 may include a text prompt "Device 100 requests collaboration during intelligent sound effect adjustment, whether to start up a microphone?", to prompt the user that, in an intelligent sound effect adjustment process, the first electronic device 100 whose name is "Device 100" requires the second electronic device 200 to start up the audio collection apparatus to collect an ambient sound. Specific content of the text prompt is not limited in this embodiment of this application.

The prompt box 251 may further include a "Reject" control 251A and an "Agree" control 251B. The "Reject" control 251A may be for rejecting a request that is for starting up the microphone and that is from the first electronic device 100. In response to a user operation performed on the "Reject" control 251A, the second electronic device 200 may send, to the first electronic device 100, a message for rejecting starting up the microphone. The "Agree" control 251B may be for agreeing to a request that is for starting up the microphone and that is from the first electronic device 100. In response to a user operation performed on the "Agree" control 251B, the second electronic device 200 may start up the microphone, and send, to the first electronic device 100, a message indicating that the microphone is started up.

In some embodiments, when receiving the message indicating that the microphone is started up from the second electronic device 200, the first electronic device 100 may obtain ambient audio collected by the second electronic device 200 in a first time period, and evaluate whether a listening sound effect of the first audio played by the first electronic device 100 in the first time period at a location of the second electronic device 200 reaches an optimal sound effect. Further, the first electronic device 100 may adjust, based on a sound effect evaluation result, a playback sound effect of the first audio in a time period next to the first time period, so that the listening sound effect of the played first audio at the location of the second electronic device 200 reaches the optimal sound effect.

In some embodiments, when receiving the message for rejecting starting up the microphone from the second electronic device 200, the first electronic device 100 may determine, based on the first priority rule, an electronic device, for example, the third electronic device 300, whose priority is second to that of the second electronic device 200 in the electronic devices that each establish a communication connection to the first electronic device 100. The first electronic device 100 may send, to the third electronic device 300, the instruction that is for starting up an audio collection apparatus. Optionally, if the first electronic device 100 does not receive a reply message of the second electronic device 200 within a preset time period after sending, to the second electronic device 200, the instruction that is for starting up an audio collection apparatus, the first electronic device 100 may also determine, based on the first priority rule, an electronic device, for example, the third electronic device 300, whose priority is second to that of the second electronic device 200 in the electronic devices that each establish a communication connection to the first electronic device 100. The first electronic device 100 may send, to the third electronic device 300, the instruction that is for starting up an audio collection apparatus.

In some embodiments, the first electronic device 100 may send the instruction that is for starting up an audio collection apparatus to all electronic devices that include an audio collection apparatus in the electronic devices that each establish a communication connection to the first electronic device 100. When receiving the foregoing instruction that is for starting up an audio collection apparatus, the electronic devices may display the prompt box 250 shown in FIG. or prompt, in a manner such as a voice prompt, the user that the first electronic device 100 requests to start up the audio collection apparatus of the corresponding electronic device. After receiving a user operation of agreeing to start up the audio collection apparatus, one or more of the electronic devices may start up the audio collection apparatus and send, to the first electronic device 100, a message indicating that the audio collection apparatus is started up. Based on a sound effect evaluation result obtained based on ambient audio collected by the one or more electronic devices and the first audio played by the first electronic device 100, the first electronic device 100 may adjust the playback sound effect of the first audio played by the first electronic device 100.

In other words, the user may select one or more electronic devices from the plurality of electronic devices (for example, a watch and a mobile phone) that receive the instruction that is for starting up an audio collection apparatus, to start up the audio collection apparatus, so as to assist the first electronic device 100 in intelligently adjusting the sound effect.

The plurality of selected electronic devices may be electronic devices carried by a plurality of users. For example, both a watch of a first user and a watch of a second user start up a microphone to collect ambient sounds at a location of the first user and a location of the second user. Based on a sound effect evaluation result obtained based on ambient audio obtained by the two electronic devices through collection and the first audio played by the first electronic device 100, the first electronic device 100 may adjust the playback sound effect of the first audio played by the first electronic device 100, so that both a listening sound effect of the first audio at the location of the first user and a listening sound effect of the first audio at the location of the second user are close to the optimal sound effect. That is, both the first user and the second user can have a good hearing feeling when listening to the audio played by the first electronic device 100.

The following describes an implementation method in which the sound effect evaluation module obtains the sound effect evaluation result based on the first audio and the ambient audio.

In a process in which the first electronic device 100 plays the first audio, the ambient sound that may be collected by the second electronic device 200 mainly includes a sound of playing the first audio and background noise near the second electronic device 200. In this case, the ambient audio collected by the second electronic device 200 mainly includes a played audio part and a background noise part. An audio signal of the played audio part comes from the sound of playing the first audio. An audio signal of the background noise part comes from the background noise near the second electronic device 200.

The sound effect evaluation module may perform sound source separation on the ambient audio, and divide the ambient audio into two audio parts: the played audio part and the background noise part.

In a possible implementation, the sound effect evaluation module may separate the background noise part in the ambient audio by using a spectral subtraction method. Specifically, the ambient audio is superimposition of the audio signal of the played audio part and the audio signal of the background noise part. That is, the background noise is additive noise. It is assumed that the played audio part is not related to the background noise part, and the background noise is stable or slowly changes, the sound effect evaluation module may estimate a spectrum of the background noise part. Further, the audio evaluation module may subtract the spectrum of the background noise part from a spectrum of the ambient audio, to obtain a spectrum of the played audio part. In this way, the sound effect evaluation module may implement sound source separation of the ambient audio.

An implementation method of the foregoing spectral subtraction method is simple, and a calculation amount is small. The sound effect evaluation module may quickly separate the played audio part and the background noise part in the ambient audio by using the spectral subtraction method, and the obtained audio signal of the played audio part has a high signal-to-noise ratio.

In a possible implementation, the sound effect evaluation module may separate the background noise part in the ambient audio by using a trained neural network. Specifically, the neural network may be trained by using a large quantity of training samples. One training sample may include the foregoing ambient audio and the played audio part of the ambient audio. The trained neural network may receive the ambient audio, and output the played audio part of the ambient audio. In this way, the sound effect evaluation module may implement sound source separation of the ambient audio.

For a specific process of training the neural network, refer to an implementation process of training a neural network in a conventional technology. Details are not described in this embodiment of this application. The neural network may be, for example, a convolutional neural network or a deep neural network. A type of the foregoing neural network is not limited in this embodiment of this application.

In the foregoing implementation method of performing sound source separation by using the trained neural network, a large quantity of calculations are required to obtain the trained neural network. The trained neural network can separate the played audio part from the background noise part in the ambient audio well.

In a possible implementation, the sound effect evaluation module may separate the background noise part in the ambient audio by using a blind source separation method. Specifically, the second electronic device 200 may collect the ambient sound by using two or more microphones, to obtain the ambient audio. Because sounds from different sources (for example, the sound of the first audio or a sound of each sound source in the background noise) are generated in different physical processes, the sounds from the different sources are independent of each other. When the plurality of microphones collect the ambient sound, audio obtained by collecting a sound from a same sound source by the plurality of microphones is different. Based on the ambient audio obtained by the plurality of microphones through collection, the sound effect evaluation module may determine directions of different sound sources in the ambient sound (for example, a direction of the sound of the first audio or a direction of each sound source in the background noise). Further, the sound effect evaluation module may determine, by using independent components analysis, audio signals corresponding to the sounds from the different sources in the ambient audio. In this way, the sound effect evaluation module may implement sound source separation of the ambient audio.

The foregoing implementation method of using the blind source separation method requires that the electronic device that collects the ambient sound includes at least two microphones. The blind source separation method can separate the played audio part from the background noise part in the ambient audio well.

The sound effect evaluation module may perform sound source separation on the ambient audio in one or more of the foregoing implementations. In addition to the foregoing sound source separation methods, the sound effect evaluation module may alternatively separate the played audio part from the background noise part in the ambient audio by using another source separation method.

Further, the sound effect evaluation module may obtain an audio signal of the first audio in the optimal sound effect. The first audio may be an audio file played by the first electronic device 100, and includes a to-be-output audio signal. In a possible implementation, the first audio may be stored in a buffer area before being output by a speaker. The electronic device may extract the first audio from the buffer area, and deliver the first audio to the sound effect evaluation module. A manner in which the sound effect evaluation module obtains the first audio is not limited in this embodiment of this application. When obtaining the first audio, the sound effect evaluation module may determine, based on a value range of each audio parameter at the optimal sound effect, the audio signal of the first audio at the optimal sound effect.

The sound effect evaluation module may obtain the sound effect evaluation result by comparing a difference between the audio signal of the first audio at the optimal sound effect and the audio signal of the played audio part. The sound effect evaluation result may indicate a difference between a listening sound effect of the user and the optimal sound effect. The difference between the listening sound effect and the optimal sound effect may be specifically a difference between a corresponding audio parameter when the first audio is played at the listening sound effect and the corresponding audio parameter when the first audio is played at the optimal sound effect. For example, when the first audio is played at the listening sound effect, loudness is 50 decibels. When the first audio is played at the optimal sound effect, loudness is 60 decibels. In this case, the difference between the listening sound effect and the optimal sound effect may include a difference between the loudness in the audio parameters, that is, a 10-dB difference. The foregoing loudness is not limited. The difference between the listening sound effect and the optimal sound effect may alternatively include a difference between values of another parameter in the audio parameters, for example, a difference between center frequencies in an EQ, a difference between gains, a difference between frequency band ranges in a DRC, or a difference between compression rates.

In some embodiments, the sound effect evaluation module may obtain a plurality of pieces of ambient audio. The plurality of pieces of ambient audio may be separately collected by a plurality of different electronic devices (for example, electronic devices carried by a plurality of users). The sound effect evaluation module may perform sound source separation on the plurality of pieces of ambient audio, and compare a difference between the audio signal of the first audio at the optimal sound effect and an audio signal of a played audio part in the plurality of pieces of ambient audio, to obtain a sound effect evaluation result. In other words, the sound effect evaluation result may indicate differences between listening sound effects of the plurality of users and the optimal sound effect.

The sound effect evaluation module may be disposed in one or more electronic devices of the electronic devices such as the first electronic device 100, the second electronic device 200, or the third electronic device 300. This is not limited in embodiments of this application.

The following describes an implementation method in which the sound effect adjustment module adjusts the playback sound effect of the first audio based on the sound effect evaluation result.

A sound effect adjustment module may be integrated into the processor 110 of the first electronic device 100. The sound effect adjustment module may adjust loudness of the audio played by the first electronic device 100. The sound effect adjustment module may include an audio signal adjustment component such as an EQ component and a DRC component. By using the EQ component and the DRC component, the sound effect adjustment module may apply an effect such as equalization and dynamic range control to the first audio, to adjust the playback sound effect of the first audio.

The sound effect adjustment module may obtain the sound effect evaluation result of the sound effect evaluation module. If the sound effect evaluation result indicates that the difference between the listening sound effect and the optimal sound effect is less than a preset threshold, the sound effect adjustment module may keep each current audio parameter unchanged. If the sound effect evaluation result indicates that the difference between the listening sound effect and the optimal sound effect is greater than the preset threshold, the sound effect adjustment module may adjust each audio parameter to change the playback sound effect of the first audio, so that the difference between the listening sound effect of the user and the optimal sound effect is less than the preset threshold. The sound effect adjustment module may process the first audio by using each adjusted audio parameter, and deliver an audio signal obtained through processing to a speaker. The speaker may play the audio signal obtained through processing.

In some embodiments, the sound effect evaluation result may include differences between listening sound effects at locations of a plurality of electronic devices and the optimal sound effect. When obtaining the sound effect evaluation result, the sound effect adjustment module may calculate an average value of the differences between the listening sound effects at the locations of the plurality of electronic devices and the optimal sound effect. Then, the sound effect adjustment module may adjust each audio parameter based on the average value obtained through calculation, to change the playback sound effect of the first audio. In this way, the first electronic device 100 may enable users at the locations of the plurality of electronic devices to have a good hearing feeling when listening to the first audio.

It can be learned from the foregoing method that the first electronic device 100 may determine, based on the ambient audio collected by the second electronic device 200, the listening sound effect of listening to the first audio by the user. In this way, the first electronic device 100 may dynamically adjust the audio parameter in a process of playing the first audio, to reduce impact of a factor such as a change of a distance between the user and the first electronic device 100, a change of an angle, and a change of background noise on the listening sound effect of the user, so that the listening sound effect of the user can reach or be close to the optimal sound effect.

In some embodiments, the sound effect adjustment module may further adjust, based on the audio signal of the background noise part separated from the ambient audio, the loudness of playing the first audio. For example, a larger amplitude of the audio signal of the background noise part (namely, louder background noise) indicates a greater adjustment amount of loudness that is of the first audio and that is adjusted by the sound effect adjustment module in a playback process.

It may be understood that when background noise at the location of the user is louder, the first electronic device 100 may increase loudness, to prevent the background noise from drowning a sound of the first audio played by the first electronic device 100.

In some embodiments, when the played audio part is separated from the background noise part in the ambient audio, the sound effect evaluation module may further evaluate whether the background noise part includes a human sound. If determining that the background noise part includes the human sound, the sound effect evaluation module may send, to the sound effect adjustment module, a message indicating that the background noise part includes the human sound. Further, the sound effect adjustment module may keep the loudness of playing the first audio unchanged, or reduce the loudness of playing the first audio.

It may be understood that when the background noise part includes the human sound, there is a high probability that the user is chatting with another person or is making a call. The first electronic device 100 keeps the loudness of playing the first audio unchanged or decreases the loudness of playing the first audio, so that impact of playing the first audio on a user chat or a call can be reduced, to prevent the sound of the first audio from interfering with a sound of user speaking.

A specific method of evaluating whether the background noise part includes the human sound is not limited in this embodiment of this application. For example, the sound effect evaluation module may identify, by using a support vector machine algorithm, whether the audio signal of the background noise part includes the human sound. For a specific process of evaluating whether the background noise part includes the human sound, refer to an implementation process of identifying whether audio includes the human sound in a conventional technology.

The following describes a sound effect adjustment method according to an embodiment of this application based on a scenario in which the first electronic device 100 evaluates and adjusts the sound effect and the second electronic device 200 collects the ambient sound.

Figure 6:
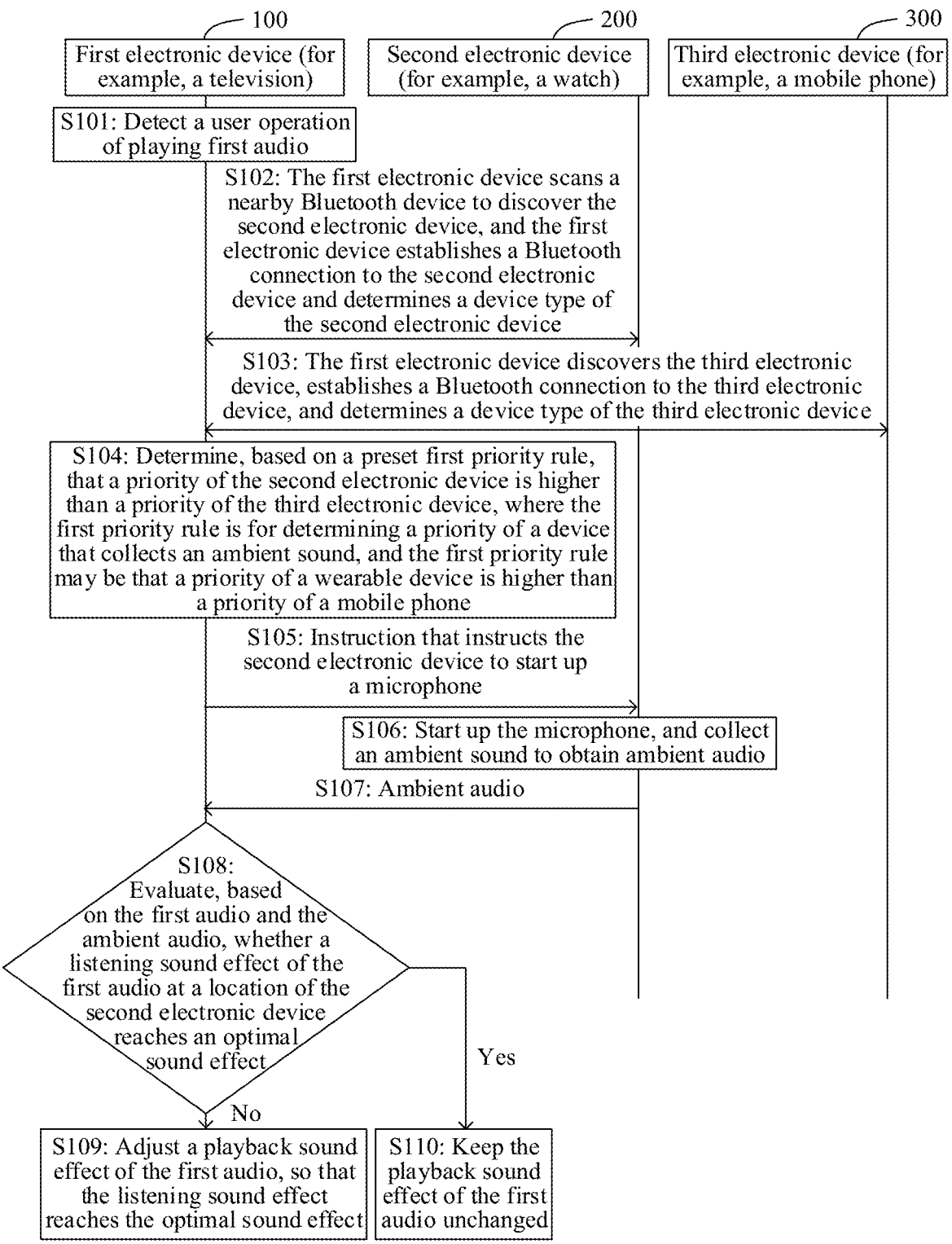
FIG. 6 is a flowchart of a sound effect adjustment method according to an embodiment of this application.

For example, FIG. 6 is a flowchart of a sound effect adjustment method according to an embodiment of this application. As shown in FIG. 6, the method may include steps S101 to S110. The method is described by using an example in which a first electronic device 100 establishes a Bluetooth connection to a nearby electronic device.

S101: The first electronic device 100 (for example, a television) detects a user operation of playing first audio.

The user operation of playing the first audio may be, for example, the user operation performed on the playback control 244 shown in FIG. 4A.

S102: The first electronic device 100 may scan a nearby Bluetooth device to discover a second electronic device 200 (for example, a watch), and the first electronic device 100 may establish a Bluetooth connection to the second electronic device 200 and determine a device type of the second electronic device 200.

S103: The first electronic device 100 further discovers a third electronic device 300 (for example, a mobile phone). The first electronic device may establish a Bluetooth connection to the third electronic device 300 and determine a device type of the third electronic device 300.

When detecting the user operation of playing the first audio, the first electronic device 100 may scan a nearby Bluetooth device. For a manner in which the first electronic device 100 establishes a communication connection to the nearby Bluetooth device, refer to the foregoing embodiments. Details are not described herein again.

For example, the first electronic device 100 establishes a Bluetooth connection to the second electronic device 200 and the third electronic device 300. The first electronic device 100 may determine the device type of the second electronic device 200, for example, the watch. The first electronic device 100 may determine the device type of the third electronic device 300, for example, the mobile phone.

S104: The first electronic device 100 may determine, based on a preset first priority rule, that a priority of the second electronic device 200 is higher than a priority of the third electronic device 300, where the first priority rule may be for determining a priority of a device that collects an ambient sound, and the first priority rule may be that a priority of a wearable device is higher than a priority of a mobile phone.

It can be learned from step S103 that the device type of the second electronic device 200 is the watch (namely, the wearable device). The device type of the third electronic device 300 is the mobile phone. The second electronic device 200 has a higher possibility of being an electronic device carried by a user. The first electronic device 100 may preferentially request the second electronic device 200 as a collaboration device to collect an ambient sound at a location of the user. For a method in which the first electronic device 100 determines, based on the first priority rule, the electronic device that collects the ambient sound, refer to descriptions in the foregoing embodiments. Details are not described herein again.

In addition to determining, based on the foregoing first priority rule, the electronic device that collects the ambient sound, the first electronic device 100 may alternatively determine, based on an electronic device selected by the user, the electronic device that collects the ambient sound. For a specific implementation method, refer to descriptions of embodiments shown in FIG. 4A to FIG. 4D.

S105: The first electronic device 100 may send, to the second electronic device 200, an instruction that instructs the second electronic device 200 to start up a microphone.

S106: The second electronic device 200 may start up the microphone, and collect an ambient sound to obtain ambient audio.

In a possible implementation, when receiving, from the first electronic device 100, the instruction that is for starting up the microphone, the second electronic device 200 may directly start up the microphone to collect the ambient sound.

In another possible implementation, when receiving, from the first electronic device 100, the instruction that is for starting up the microphone, the second electronic device 200 may display the prompt box 251 shown in FIG. 5B, to query a user of the second electronic device 200 whether to agree to start up the microphone. When receiving a user operation of agreeing to start up the microphone, the second electronic device 20 may start up the microphone to collect the ambient sound.

An apparatus that is in the second electronic device 200 and that is configured to collect the ambient sound is not limited to the microphone, and may alternatively be an audio collection apparatus of another type.

In some embodiments, the second electronic device 200 may collect an ambient sound of a preset time length at intervals of a preset time period, to obtain the ambient audio. The second electronic device 200 may send, to the first electronic device 100, the ambient audio collected each time. The ambient audio may include a time identifier. The time identifier may indicate a collection time of the ambient audio. In this way, the first electronic device 100 may evaluate the first audio played in the same time period and the collected ambient audio, to adjust a playback sound effect of the first audio in a next time period.

S107: The second electronic device 200 may send the ambient audio to the first electronic device 100.

S108: The first electronic device 100 may evaluate, based on the first audio and the ambient audio, whether a listening sound effect of the first audio at a location of the second electronic device 200 reaches an optimal sound effect.

S109: If the listening sound effect of the first audio at the location of the second electronic device 200 does not reach the optimal sound effect, the first electronic device 100 may adjust the playback sound effect of the first audio, so that the listening sound effect reaches the optimal sound effect.

S110: If the listening sound effect of the first audio at the location of the second electronic device 200 reaches the optimal sound effect, the first electronic device 100 may keep the playback sound effect of the first audio unchanged, and continue to play the first audio.

The first electronic device 100 may include a sound effect evaluation module and a sound effect adjustment module. When the ambient audio collected by the second electronic device 200 is received, the sound effect evaluation module may obtain a sound effect evaluation result based on the first audio and the ambient audio. The sound effect evaluation result may indicate whether the listening sound effect of the first audio at the location of the second electronic device 200 reaches the optimal sound effect. Further, the sound effect adjustment module may adjust, based on the sound effect evaluation result, an audio parameter for playing the first audio, to adjust the playback sound effect of the first audio. For a specific implementation method in which the first electronic device 100 performs sound effect evaluation and sound effect adjustment, refer to descriptions in the foregoing embodiments. Details are not described herein again.

A communication connection manner between the first electronic device 100 and the nearby electronic device is not limited to the Bluetooth connection, and may alternatively be another communication connection manner. This is not limited in this embodiment of this application.

In some embodiments, when the first electronic device 100 detects that the first electronic device 100 stops playing the audio, the first electronic device 100 may send, to the second electronic device 200, an instruction that instructs to deactivate the microphone of the second electronic device 200. Further, the second electronic device 200 may deactivate the microphone.

It can be learned from the sound effect adjustment method shown in FIG. 6 that the first electronic device that plays the first audio may collect, by using the second electronic device carried by a user, an ambient sound at a location of the user. Based on the first audio and a sound effect evaluation result of ambient audio at the location of the user, the first electronic device may determine a listening sound effect of the first audio at the location of the user. The first electronic device may adjust the playback sound effect of the first audio, so that the listening sound effect of the first audio at the location of the user reaches the sound effect at the optimal listening location and in the quiet environment. In other words, in a process of playing audio by the first electronic device, a sound effect (namely, the listening sound effect) heard by the user may not be affected by a factor such as a change of a distance between the user and the first electronic device, a change of an angle, or a change of ambient noise. The first electronic device may dynamically adjust the playback sound effect of the first audio based on a change of a location environment of the user, and the user does not need to manually adjust the playback sound effect of the first audio, so that audio listening experience of the user is greatly improved.

The following describes another sound effect adjustment method according to an embodiment of this application based on a scenario in which the second electronic device 200 collects the ambient audio and evaluates the sound effect, and the first electronic device 100 adjusts the sound effect.

Figure 7:
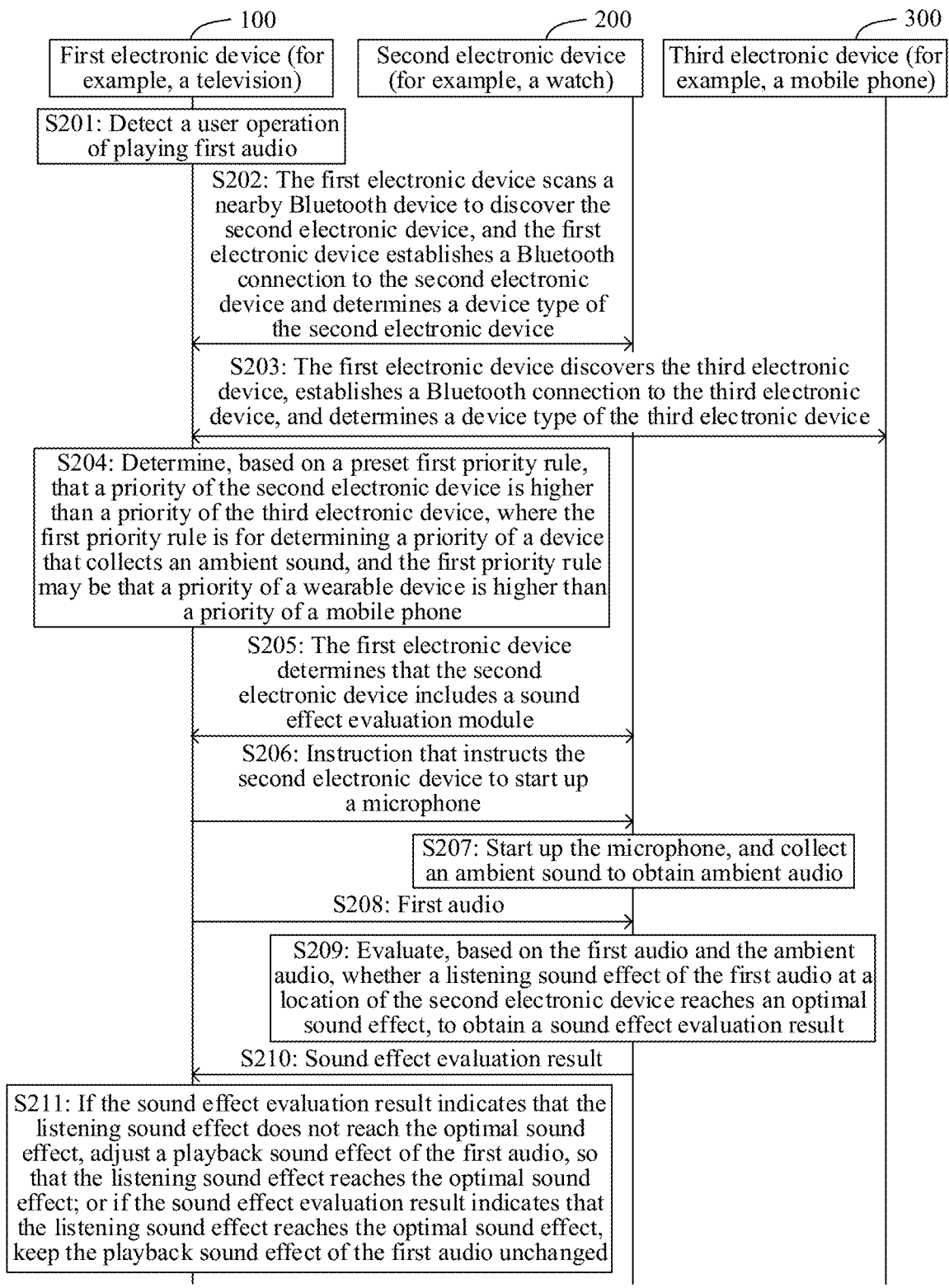
FIG. 7 is a flowchart of another sound effect adjustment method according to an embodiment of this application.

For example, FIG. 7 is a flowchart of another sound effect adjustment method according to an embodiment of this application. As shown in FIG. 7, the method may include steps S201 to S211.

S201: A first electronic device 100 (for example, a television) detects a user operation of playing first audio.

S202: The first electronic device 100 may scan a nearby Bluetooth device to discover a second electronic device 200 (for example, a watch), and the first electronic device 100 may establish a Bluetooth connection to the second electronic device 200 and determine a device type of the second electronic device 200.

S203: The first electronic device 100 further discovers a third electronic device 300 (for example, a mobile phone). The first electronic device may establish a Bluetooth connection to the third electronic device 300 and determine a device type of the third electronic device 300.

S204: The first electronic device 100 may determine, based on a preset first priority rule, that a priority of the second electronic device 200 is higher than a priority of the third electronic device 300, where the first priority rule may be for determining a priority of a device that collects an ambient sound, and the first priority rule may be that a priority of a wearable device is higher than a priority of a mobile phone.

For an implementation process of steps S201 to S204, refer to descriptions of steps S101 to S104 shown in FIG. 6. Details are not described herein again.

S205: The first electronic device 100 may determine that the second electronic device 200 includes a sound effect evaluation module.

When determining, according to step S204, the electronic device configured to collect the ambient sound, the first electronic device 100 may query whether the electronic device includes the sound effect evaluation module. If the electronic device includes the sound effect evaluation module, the first electronic device 100 may indicate the electronic device to perform sound effect evaluation and return a sound effect evaluation result.

For example, the first electronic device 100 determines, based on the first priority rule, that a priority of the second electronic device 200 (watch) is the highest in electronic devices that each establish a communication connection to the first electronic device 100. The first electronic device 100 may send, to the second electronic device 200, a message that is for querying whether the second electronic device 200 includes the sound effect evaluation module. If the second electronic device 200 includes the sound effect evaluation module, the second electronic device 200 may send, to the first electronic device 100, a message that indicates that the second electronic device 200 includes the sound effect evaluation module. In this way, the first electronic device 100 may determine that the second electronic device 200 includes the sound effect evaluation module.

If the second electronic device 200 does not include the sound effect evaluation module, the first electronic device 100 may further query whether another electronic device (for example, the third electronic device 300) that establishes a communication connection includes the sound effect evaluation module.

S206: The first electronic device 100 may send, to the second electronic device 200, an instruction that instructs the second electronic device 200 to start up a microphone.

S207: The second electronic device 200 may start up the microphone, and collect an ambient sound to obtain ambient audio.

For step S206 and step S207, respectively refer to step S105 and step S106 shown in FIG. 6. Details are not described herein again.

S208: The first electronic device 100 may send the first audio to the second electronic device 200.

S209. The second electronic device 200 may evaluate, based on the first audio and the ambient audio, whether a listening sound effect of the first audio at a location of the second electronic device 200 reaches an optimal sound effect, to obtain a sound effect evaluation result.

S210: The second electronic device 200 may send the sound effect evaluation result to the first electronic device 100.

S211: If the sound effect evaluation result indicates that the listening sound effect does not reach the optimal sound effect, the first electronic device 100 may adjust a playback sound effect of the first audio, so that the listening sound effect reaches the optimal sound effect. If the sound effect evaluation result indicates that the listening sound effect reaches the optimal sound effect, the first electronic device 100 may keep the playback sound effect of the first audio unchanged.

For an implementation method in which the sound effect evaluation module in the second electronic device 200 evaluates the sound effect and the first electronic device 100 adjusts the sound effect of the first audio based on the sound effect evaluation result, refer to descriptions in the foregoing embodiments. Details are not described herein again.

In some embodiments, when the first electronic device 100 detects that the first electronic device 100 stops playing the audio, the first electronic device 100 may send, to the second electronic device 200, an instruction that instructs to deactivate the microphone of the second electronic device 200. Further, the second electronic device 200 may deactivate the microphone.

It can be learned from the sound effect adjustment method shown in FIG. 7 that the first electronic device that plays the first audio may collect, by using the second electronic device carried by a user, an ambient sound at a location of the user. If the first electronic device does not include the sound effect evaluation module or current consumption of software and hardware resources is excessively high, the first electronic device may indicate the second electronic device including the sound effect evaluation module to perform sound effect evaluation. In this way, software and hardware resources of the first electronic device and the second electronic device can be properly scheduled, and sound effect evaluation efficiency can be improved.

Based on the first audio and a sound effect evaluation result of ambient audio at the location of the user, the first electronic device may determine a listening sound effect of the first audio at the location of the user. The first electronic device may adjust the playback sound effect of the first audio, so that the listening sound effect of the first audio at the location of the user reaches the sound effect at the optimal listening location and in the quiet environment. In other words, in a process of playing audio by the first electronic device, a sound effect (namely, the listening sound effect) heard by the user may not be affected by a factor such as a change of a distance between the user and the first electronic device, a change of an angle, or a change of ambient noise. The first electronic device may dynamically adjust the playback sound effect of the first audio based on a change of a location environment of the user, and the user does not need to manually adjust the playback sound effect of the first audio, so that audio listening experience of the user is greatly improved.

The following describes another sound effect adjustment method according to an embodiment of this application based on a scenario in which the first electronic device 100 plays the first audio and adjusts the playback sound effect, the second electronic device 200 collects the ambient audio, and the third electronic device 300 evaluates the sound effect.

Figure 8A:
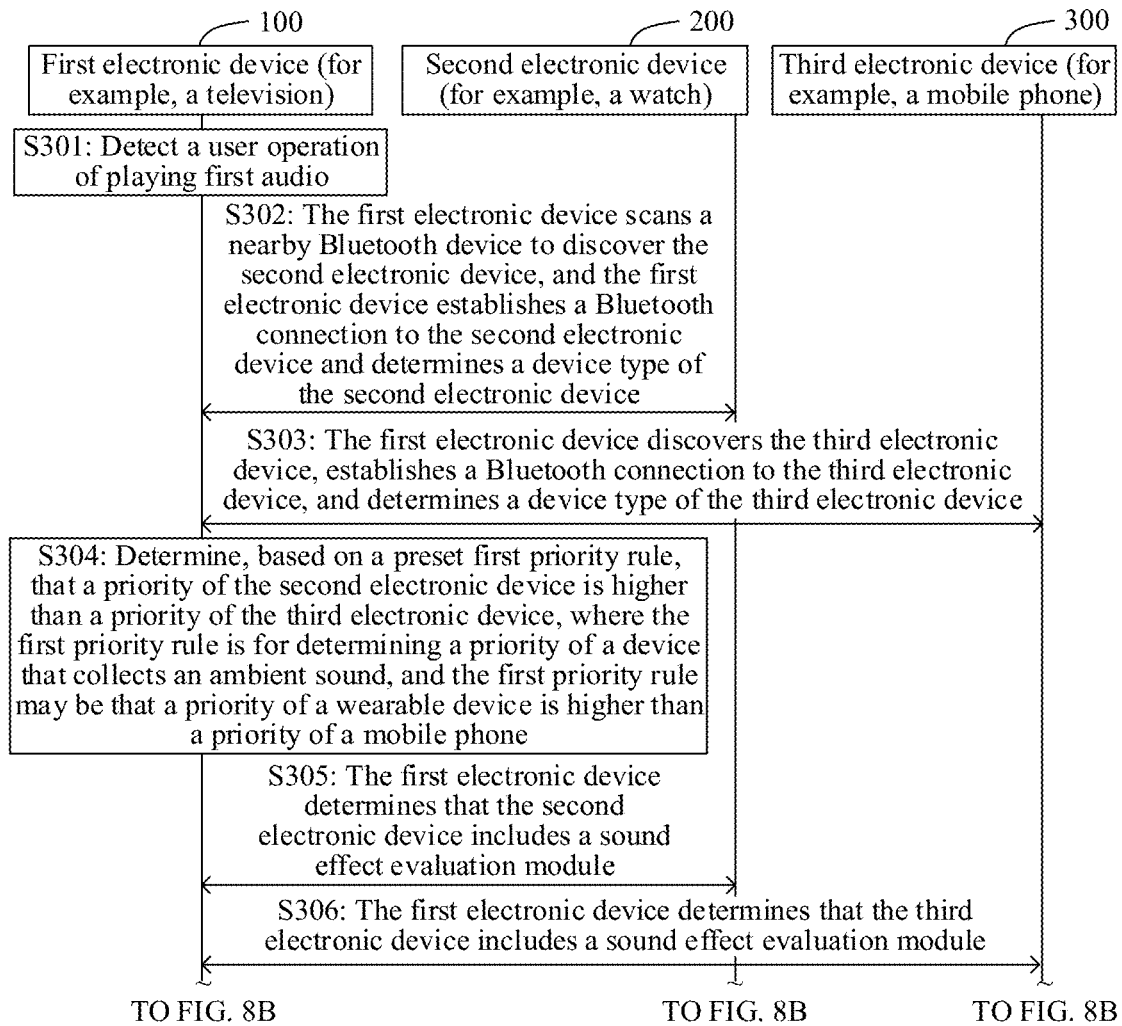
FIG. 8A and FIG. 8B are a flowchart of another sound effect adjustment method according to an embodiment of this application.
Figure 8B:
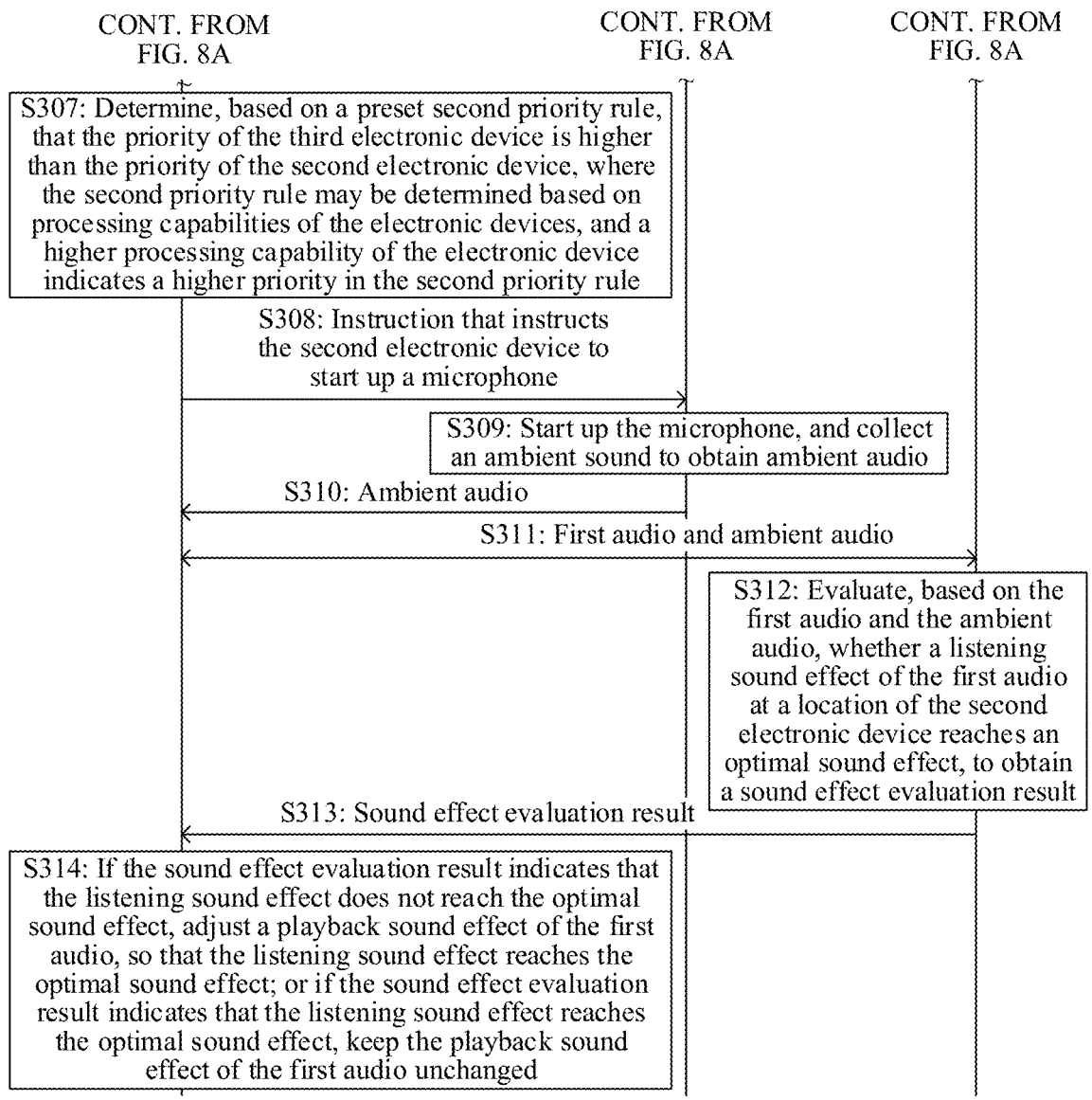

For example, FIG. 8A and FIG. 8B show another sound effect adjustment method according to an embodiment of this application. As shown in FIG. 8A and FIG. 8B, the method may include steps S301 to S314.

S301: A first electronic device 100 (for example, a television) detects a user operation of playing first audio.

S302: The first electronic device 100 may scan a nearby Bluetooth device to discover a second electronic device 200 (for example, a watch), and the first electronic device 100 may establish a Bluetooth connection to the second electronic device 200 and determine a device type of the second electronic device 200.

S303: The first electronic device 100 further discovers a third electronic device 300 (for example, a mobile phone). The first electronic device may establish a Bluetooth connection to the third electronic device 300 and determine a device type of the third electronic device 300.

S304: The first electronic device 100 may determine, based on a preset first priority rule, that a priority of the second electronic device 200 is higher than a priority of the third electronic device 300, where the first priority rule may be for determining a priority of a device that collects an ambient sound, and the first priority rule may be that a priority of a wearable device is higher than a priority of a mobile phone.

For steps S301 to S304, refer to steps S101 to S104 shown in FIG. 6. Details are not described herein again.

S305: The first electronic device 100 may determine that the second electronic device 200 includes a sound effect evaluation module.

S306. The first electronic device 100 may determine that the third electronic device 300 includes a sound effect evaluation module.

The first electronic device 100 may determine whether all electronic devices that each establish a communication connection to the first electronic device 100 include the sound effect evaluation module. The electronic devices may reply, to the first electronic device 100, a message that indicates that the sound effect evaluation module is included or a message that indicates that the sound effect evaluation module is not included.

For example, both the second electronic device 200 and the third electronic device 300 include the sound effect evaluation module. The first electronic device 100 may determine that the second electronic device 200 includes the sound effect evaluation module, and determine that the third electronic device 300 includes the sound effect evaluation module.

S307: The first electronic device 100 may determine, based on a preset second priority rule, that a priority of the third electronic device 300 is higher than a priority of the second electronic device 200, where the second priority rule may be determined based on processing capabilities of the electronic devices, and a higher processing capability of an electronic device indicates a higher priority of the electronic device in the second priority rule.

The second priority rule may be preset in the first electronic device 100. A processing capability of a mobile phone is usually higher than a processing capability of a wearable device. In the second priority rule, a priority of the mobile phone may be higher than a priority of the wearable device. In other words, the first electronic device 100 may determine, based on the second priority rule, that the priority of the third electronic device 300 (mobile phone) is higher than the priority of the second electronic device 200 (watch). The first electronic device 100 may indicate the third electronic device 300 to perform sound effect evaluation.

A priority sequence of electronic devices of different types in the second priority rule is not limited to being determined based on processing capabilities of the electronic devices. In the priority sequence in the second priority rule, the priority sequence of the electronic devices may alternatively be determined based on current software and hardware resource occupation statuses (namely, busy statuses) of the electronic devices. A method of determining the priority sequence in the second priority rule is not limited in this embodiment of this application.

S308: The first electronic device 100 may send, to the second electronic device 200, an instruction that instructs the second electronic device 200 to start up a microphone.

S309: The second electronic device 200 may start up the microphone, and collect an ambient sound to obtain ambient audio.

For step S308 and step S309, respectively refer to step S105 and step S106 shown in FIG. 6. Details are not described herein again.

S310: The second electronic device 200 may send the ambient audio to the first electronic device 100.

In a possible implementation, the second electronic device 200 may send the ambient audio to the first electronic device 100.

In another possible implementation, the first electronic device 100 may indicate the electronic device (for example, the second electronic device 200) configured to collect the ambient sound to establish a communication connection to the electronic device (for example, the third electronic device 300) configured to perform sound effect evaluation. Alternatively, the first electronic device 100 may indicate the electronic device (for example, the third electronic device 300) configured to perform sound effect evaluation to establish a communication connection to the electronic device (for example, the second electronic device 200) configured to collect the ambient sound. Further, the first electronic device 100 may indicate the second electronic device 200 to send the collected ambient audio to the third electronic device 300. In this way, the second electronic device 200 may not need to forward the ambient audio to the third electronic device 300 via the first electronic device 100.

S311: The first electronic device 100 may send the first audio and the ambient audio to the third electronic device 300.

When receiving the ambient audio from the second electronic device 200, the first electronic device 100 may send the first audio and the ambient audio together to the third electronic device 300. In addition, the first electronic device 100 may indicate the third electronic device 300 to perform sound effect evaluation.

Alternatively, the second electronic device 200 establishes a communication connection to the third electronic device 300. The second electronic device 200 may send the ambient audio to the third electronic device 300. The first electronic device 100 may send the first audio to the third electronic device 300.

S312: The third electronic device 300 may evaluate, based on the first audio and the ambient audio, whether a listening sound effect of the first audio at a location of the second electronic device 200 reaches an optimal sound effect, to obtain a sound effect evaluation result.

S313: The third electronic device 300 may send the sound effect evaluation result to the first electronic device 100.

S314: If the sound effect evaluation result indicates that the listening sound effect does not reach the optimal sound effect, the first electronic device 100 may adjust a playback sound effect of the first audio, so that the listening sound effect reaches the optimal sound effect. If the sound effect evaluation result indicates that the listening sound effect reaches the optimal sound effect, the first electronic device 100 may keep the playback sound effect of the first audio unchanged.

For an implementation method in which the sound effect evaluation module in the third electronic device 300 evaluates the sound effect and the first electronic device 100 adjusts the playback sound effect of the first audio based on the sound effect evaluation result, refer to descriptions in the foregoing embodiments. Details are not described herein again.

In some embodiments, when the first electronic device 100 detects that the first electronic device 100 stops playing the audio, the first electronic device 100 may send, to the second electronic device 200, an instruction that instructs to deactivate the microphone of the second electronic device 200. Further, the second electronic device 200 may deactivate the microphone.

It can be learned from the sound effect adjustment method shown in FIG. 8A and FIG. 8B that the first electronic device that plays the first audio may collect, by using the second electronic device carried by a user, an ambient sound at a location of the user. The first electronic device may indicate the electronic device that is in the electronic devices that each establish a communication connection to the first electronic device, that includes the sound effect evaluation module, and that has a high processing capability or low software and hardware resource usage, to perform sound effect evaluation. In this way, software and hardware resources of an electronic device near the first electronic device can be properly scheduled, so that sound effect evaluation efficiency is improved, and sound effect adjustment is better performed.

Based on the first audio and an evaluation result of ambient audio at the location of the user, the first electronic device may determine a listening sound effect of the first audio at the location of the user. The first electronic device may adjust the playback sound effect of the first audio, so that the listening sound effect of the first audio at the location of the user reaches the sound effect at the optimal listening location and in the quiet environment. In other words, in a process of playing audio by the first electronic device, a sound effect (namely, the listening sound effect) heard by the user may not be affected by a factor such as a change of a distance between the user and the first electronic device, a change of an angle, or a change of ambient noise. The first electronic device may dynamically adjust the playback sound effect of the first audio based on a change of a location environment of the user, and the user does not need to manually adjust the playback sound effect of the first audio, so that audio listening experience of the user is greatly improved.

In this embodiment of this application, the first electronic device is configured to play the first audio. The first electronic device may start to play the first audio after detecting a user operation for playing the first audio. The user operation of playing the first audio may be, for example, the user operation performed on the playback control 244 shown in FIG. 4A. The second electronic device is configured to collect second audio when the first audio is played. After detecting the user operation for playing the first audio, the first electronic device may send, to the second electronic device, an instruction that is for starting up a microphone to collect the second audio.

In this embodiment of this application, the first electronic device may play the first audio at a first sound effect. The first sound effect may be the playback sound effect in the foregoing embodiments. The first electronic device may adjust the first sound effect by changing loudness or adjusting an audio parameter such as a parameter in an EQ of an audio signal and a parameter in a DRC.

In this embodiment of this application, one of the first electronic device, the second electronic device, and the third electronic device may determine a second sound effect based on the second audio. The second sound effect is a listening sound effect on the second electronic device of the first audio played at the first sound effect. In other words, when the first electronic device plays the first audio at the first sound effect, a sound effect heard by the user at the location of the second electronic device is the second sound effect.

In this embodiment of this application, one of the first electronic device, the second electronic device, and the third electronic device may evaluate whether a difference between the second sound effect and a third sound effect exceeds a first difference, and determine a playback sound effect of the first audio as a fourth sound effect when the difference between the second sound effect and the third sound effect exceeds the first difference. The fourth sound effect is the playback sound effect in the foregoing embodiments. A result of evaluating whether the difference between the second sound effect and the third sound effect exceeds the first difference is the sound effect evaluation result in the foregoing embodiments. The first difference may be preset. For example, the first difference may include a difference between audio parameters such as a difference between loudness, a difference between center frequencies in an EQ, a difference between gains in the EQ, a difference between frequency band ranges in a DRC, or a difference between compression rates in the DRC. The third sound effect is an optimal sound effect of the first audio played at the first sound effect. The third sound effect may be obtained by querying the optimal sound effect mapping table in the foregoing embodiment or by using the optimal sound effect calculation algorithm. A difference between the third sound effect and a listening sound effect on the second electronic device of the first audio played at the fourth sound effect is less than the first difference.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, wherein the method is applied to a sound effect adjustment system, the sound effect adjustment system comprises a first electronic device and a second electronic device, and a communication connection is established between the first electronic device and the second electronic device;
the first electronic device is configured to play first audio, and the second electronic device is configured to collect second audio in response to determining that the first audio is played; and
the method comprises:
determining a second sound effect based on the second audio in response to determining that the first audio is played at a first sound effect, wherein the second sound effect is a listening sound effect on the second electronic device of the first audio played at the first sound effect; and determining a playback sound effect of the first audio as a fourth sound effect in response to determining that a difference between the second sound effect and a third sound effect exceeds a first difference, wherein a difference between the third sound effect and a listening sound effect on the second electronic device of the first audio played at the fourth sound effect is less than the first difference, and the third sound effect is an optimal sound effect of the first audio played at the first sound effect, wherein the fourth sound effect is determined based on analyzing the second audio to separate a first audio part corresponding to the first audio and a background noise part, and wherein an audio parameter of the fourth sound effect is adjusted based on the background noise part, such that louder background noise indicated by the background noise part results in greater loudness in the fourth sound effect than in the first sound effect.

2. The method according to claim 1, wherein in response to determining that the first audio is played at the first sound effect, a listening sound effect on the second electronic device at a first location is different from a listening sound effect on the second electronic device at a second location.

3. The method according to claim 1, wherein the first electronic device or the second electronic device determines the second sound effect based on the second audio in response to determining that the first audio is played at the first sound effect.

4. The method according to claim 1, wherein the first electronic device or the second electronic device determines the playback sound effect of the first audio as the fourth sound effect in response to determining that the difference between the second sound effect and the third sound effect exceeds the first difference.

5. The method according to claim 1, wherein the sound effect adjustment system further comprises a third electronic device, and a communication connection is established between the first electronic device and the third electronic device; and the third electronic device determines the second sound effect based on the second audio in response to determining that the first audio is played at the first sound effect, and determines the playback sound effect of the first audio as the fourth sound effect in response to determining that the difference between the second sound effect and the third sound effect exceeds the first difference.

6. The method according to claim 1, wherein the sound effect adjustment system further comprises a third electronic device, and a communication connection is established between the first electronic device and the third electronic device; and the method further comprises:
selecting, by the first electronic device, one of the second electronic device and the third electronic device based on processing capability strength of the second electronic device and the third electronic device or busy degrees of the second electronic device and the third electronic device, to determine the second sound effect based on the second audio in response to determining that the first audio is played at the first sound effect, or determine the playback sound effect of the first audio as the fourth sound effect in response to determining that the difference between the second sound effect and the third sound effect exceeds the first difference.

7. The method according to claim 1, wherein the method further comprises:
providing, by the first electronic device, an option for selecting an electronic device that collects the second audio, wherein the option corresponds to the second electronic device;
receiving, by the first electronic device, a user operation of selecting the option corresponding to the second electronic device; and
indicating, by the first electronic device, the second electronic device to collect the second audio.

8. The method according to claim 1, wherein the method further comprises:
determining, by the first electronic device based on a first priority rule, that the second electronic device is an electronic device with a highest priority in electronic devices that each establish a communication connection to the first electronic device, and indicating the second electronic device to collect the second audio, wherein a principle of determining a priority sequence of the electronic devices in the first priority rule is: determining, based on device types of the electronic devices, possibilities that a user carries each of the electronic devices, wherein a higher possibility corresponds to a higher priority in the first priority rule.

9. The method according to claim 1, wherein the second audio comprises a first audio part and a background noise part, the second sound effect is determined based on the first audio part and the background noise part, and louder background noise indicated by the background noise part indicates that loudness in the fourth sound effect is greater than loudness in the first sound effect.

10. The method according to claim 1, wherein the second audio comprises a first audio part and a background noise part, and the second sound effect is determined based on the first audio part and the background noise part; and in response to determining that the background noise part comprises a human sound, loudness in the fourth sound effect is the same as loudness in the first sound effect, or loudness in the fourth sound effect is smaller than loudness in the first sound effect.

11. The method according to claim 1, wherein by adjusting an audio parameter, the first audio is adjusted from being played at the first sound effect to being played at the fourth sound effect, and the audio parameter comprises one or more of the following: loudness, a parameter in an equalizer, or a parameter in a dynamic range controller.

12. A method, wherein the method comprises:
playing, by a first electronic device, first audio at a first sound effect, and establishing a communication connection to a second electronic device;
receiving, by the first electronic device, second audio from the second electronic device, wherein the second audio is collected by the second electronic device in response to determining that the first audio is played;

determining, by the first electronic device, a second sound effect based on the second audio, wherein the second sound effect is a listening sound effect on the second electronic device of the first audio played at the first sound effect; and determining, by the first electronic device, a playback sound effect of the first audio as a fourth sound effect in response to determining that a difference between the second sound effect and a third sound effect exceeds a first difference, wherein a difference between the third sound effect and a listening sound effect on the second electronic device of the first audio played at the fourth sound effect is less than the first difference, and the third sound effect is an optimal sound effect of the first audio played at the first sound effect, wherein the fourth sound effect is determined based on analyzing the second audio to separate a first audio part corresponding to the first audio and a background noise part, and wherein an audio parameter of the fourth sound effect is adjusted based on the background noise part, such that louder background noise indicated by the background noise part results in greater loudness in the fourth sound effect than in the first sound effect.

13. The method according to claim 12, wherein the method further comprises:

providing, by the first electronic device, an option for selecting an electronic device that collects the second audio, wherein the option corresponds to the second electronic device;

receiving, by the first electronic device, a user operation of selecting the option corresponding to the second electronic device; and indicating, by the first electronic device, the second electronic device to collect the second audio.

14. The method according to claim 12, wherein the method further comprises:

determining, by the first electronic device based on a first priority rule, that the second electronic device is an electronic device with a highest priority in electronic devices that each establish a communication connection to the first electronic device, and indicating the second electronic device to collect the second audio, wherein a principle of determining a priority sequence of the electronic devices in the first priority rule is: determining, based on device types of the electronic devices, possibilities that a user carries each of the electronic devices, wherein a higher possibility corresponds to a higher priority in the first priority rule.

15. The method according to claim 12, wherein the second audio comprises a first audio part and a background noise part, the second sound effect is determined based on the first audio part and the background noise part, and louder background noise indicated by the background noise part indicates that loudness in the fourth sound effect is greater than loudness in the first sound effect.

16. The method according to claim 12, wherein the second audio comprises a first audio part and a background noise part, and the second sound effect is determined based on the first audio part and the background noise part; and in response to determining that the background noise part comprises a human sound, loudness in the fourth sound effect is the same as loudness in the first sound effect, or loudness in the fourth sound effect is smaller than loudness in the first sound effect.

17. The method according to claim 12, wherein by adjusting an audio parameter, the first audio is adjusted from being played at the first sound effect to being played at the fourth sound effect, and the audio parameter comprises one or more of the following: loudness, a parameter in an equalizer, or a parameter in a dynamic range controller.

18. An electronic device, wherein the electronic device is a first electronic device, and the first electronic device comprises an audio output apparatus, a communication apparatus, at least one memory, and at least one processor, wherein the audio output apparatus is configured to play first audio;

the communication apparatus is configured to establish a communication connection to a second electronic device, and receive second audio from the second electronic device, wherein the second audio is collected by the second electronic device in response to determining that the first audio is played; and the at least one memory stores programming instructions for execution by the at least one processor to cause the first electronic device to perform operations comprising:

playing first audio at a first sound effect, and establish a communication connection to a second electronic device;

receiving second audio from the second electronic device, wherein the second audio is collected by the second electronic device in response to determining that the first audio is played;

determining a second sound effect based on the second audio, wherein the second sound effect is a listening sound effect on the second electronic device of the first audio played at the first sound effect; and determining a playback sound effect of the first audio as a fourth sound effect in response to determining that a difference between the second sound effect and a third sound effect exceeds a first difference, wherein a difference between the third sound effect and a listening sound effect on the second electronic device of the first audio played at the fourth sound effect is less than the first difference, and the third sound effect is an optimal sound effect of the first audio played at the first sound effect, wherein the fourth sound effect is determined based on analyzing the second audio to separate a first audio part corresponding to the first audio and a background noise part, and wherein an audio parameter of the fourth sound effect is adjusted based on the background noise part, such that louder background noise indicated by the background noise part results in greater loudness in the fourth sound effect than in the first sound effect.

19. The electronic device according to claim 18, wherein the operations further comprise:

providing an option for selecting an electronic device that collects the second audio, wherein the option corresponds to the second electronic device;

receive a user operation of selecting the option corresponding to the second electronic device; and indicate the second electronic device to collect the second audio.

20. The electronic device according to claim 18, wherein the operations further comprise:

determining, based on a first priority rule, that the second electronic device is an electronic device with a highest priority in electronic devices that each establish a communication connection to the first electronic device, and indicate the second electronic device to collect the second audio, wherein a principle of determining a priority sequence of the electronic devices in the first priority rule is: determining, based on device types of the electronic devices, possibilities that a user carries each of the electronic devices, wherein a higher possibility corresponds to a higher priority in the first priority rule.

* * * * *